(12) United States Patent
Murayama

(10) Patent No.: US 8,390,937 B2
(45) Date of Patent: Mar. 5, 2013

(54) ZOOM LENS, IMAGING APPARATUS AND METHOD FOR MANUFACTURING ZOOM LENS

(75) Inventor: Norio Murayama, Musashino (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/002,326

(22) PCT Filed: Jun. 25, 2009

(86) PCT No.: PCT/JP2009/062078
§ 371 (c)(1),
(2), (4) Date: Dec. 31, 2010

(87) PCT Pub. No.: WO2010/001944
PCT Pub. Date: Jan. 7, 2010

(65) Prior Publication Data
US 2011/0102908 A1    May 5, 2011

(30) Foreign Application Priority Data

Jul. 3, 2008 (JP) ................................ 2008-174783

(51) Int. Cl.
*G02B 15/14* (2006.01)
(52) U.S. Cl. ........ 359/687; 359/683; 359/684; 359/685; 359/686; 359/689; 359/690; 359/715; 359/716; 359/740; 359/774; 359/785
(58) Field of Classification Search .......... 359/683–687, 359/689, 690, 715, 716, 740, 774, 785
See application file for complete search history.

(56) References Cited

U.S. PATENT DOCUMENTS

| | | | |
|---|---|---|---|
| 7,139,131 B2 | 11/2006 | Nanba et al. | |
| 7,151,638 B2 | 12/2006 | Ohashi | |
| 7,199,941 B2 | 4/2007 | Ohtake | |
| 7,372,636 B2 | 5/2008 | Sudoh | |
| 7,382,549 B2 | 6/2008 | Miyajima | |
| 7,430,079 B2 | 9/2008 | Watanabe | |
| 7,433,132 B2 | 10/2008 | Miyajima | |
| 7,443,606 B2 | 10/2008 | Saruwatari et al. | |
| 7,477,457 B2 | 1/2009 | Satori | |
| 7,515,354 B2 | 4/2009 | Miyajima | |
| 2005/0099700 A1 | 5/2005 | Ohtake | |
| 2005/0190457 A1 | 9/2005 | Ohashi | |

(Continued)

FOREIGN PATENT DOCUMENTS

CN    101149466 A    3/2008
CN    101183172 A    5/2008

(Continued)

OTHER PUBLICATIONS

Office Action issued Jun. 1, 2012, in Chinese Application No. 200980133133.3.

*Primary Examiner* — Evelyn A. Lester
(74) *Attorney, Agent, or Firm* — Miles and Stockbridge, P.C.

(57) ABSTRACT

A zoom lens comprising, in order from an object side: a first lens group G1 having positive refractive power; a second lens group G2 having negative refractive power; and a third lens group G3 having positive refractive power; each distance between said lens groups adjacent to each other changing upon zooming from a wide-angle end state to a telephoto end state, said first lens group G1 having a cemented lens including a negative lens L11, and said third lens group G3 having a cemented lens L32 and L33, and a given conditional expression being satisfied, thereby providing a downsized zoom lens having high optical performance.

24 Claims, 13 Drawing Sheets

U.S. PATENT DOCUMENTS

| | | |
|---|---|---|
| 2005/0270661 A1 | 12/2005 | Nanba et al. |
| 2006/0098301 A1 | 5/2006 | Miyajima |
| 2006/0197852 A1 | 9/2006 | Hankawa et al. |
| 2007/0091460 A1 | 4/2007 | Saruwatari et al. |
| 2007/0201144 A1 | 8/2007 | Sudoh |
| 2007/0217024 A1 | 9/2007 | Kamo et al. |
| 2008/0088944 A1 | 4/2008 | Watanabe |
| 2008/0088945 A1 | 4/2008 | Satori |
| 2008/0111909 A1 | 5/2008 | Miyajima |
| 2008/0112061 A1 | 5/2008 | Miyajima |
| 2008/0112062 A1 | 5/2008 | Miyajima |
| 2008/0165261 A1 | 7/2008 | Kamo |
| 2008/0180808 A1 | 7/2008 | Hankawa et al. |
| 2008/0204892 A1 | 8/2008 | Satori et al. |
| 2008/0231969 A1 | 9/2008 | Satori |
| 2009/0040363 A1 | 2/2009 | Hankawa et al. |
| 2009/0103186 A1 | 4/2009 | Hankawa |
| 2009/0103187 A1 | 4/2009 | Watanebe et al. |

FOREIGN PATENT DOCUMENTS

| | | |
|---|---|---|
| JP | 2005-157279 A | 6/2005 |
| JP | 2005-242116 A | 9/2005 |
| JP | 2005-326743 A | 11/2005 |
| JP | 2005-345892 A | 12/2005 |
| JP | 2006-078979 A | 3/2006 |
| JP | 2006-133631 A | 5/2006 |
| JP | 2006-171055 A | 6/2006 |
| JP | 2006-284753 A | 10/2006 |
| JP | 2006-284753 A | 10/2006 |
| JP | 2006-309111 A | 11/2006 |
| JP | 2007-108544 A | 4/2007 |
| JP | 2007-232918 A | 9/2007 |
| JP | 2007-240747 A | 9/2007 |
| JP | 2008-76493 A | 4/2008 |
| JP | 2008-102165 A | 5/2008 |
| JP | 2008-107559 A | 5/2008 |
| JP | 2008-122879 A | 5/2008 |
| JP | 2008-122880 A | 5/2008 |
| JP | 2008-146016 A | 6/2008 |
| JP | 2008-172321 A | 7/2008 |
| JP | 2008-209773 A | 9/2008 |
| JP | 2008-225328 A | 9/2008 |
| JP | 2009-75581 A | 4/2009 |
| JP | 2009-98458 A | 5/2009 |
| JP | 2009-109630 A | 5/2009 |
| JP | 2009-157039 A | 7/2009 |
| JP | 2009-163068 A | 7/2009 |
| JP | 2009-163102 A | 7/2009 |

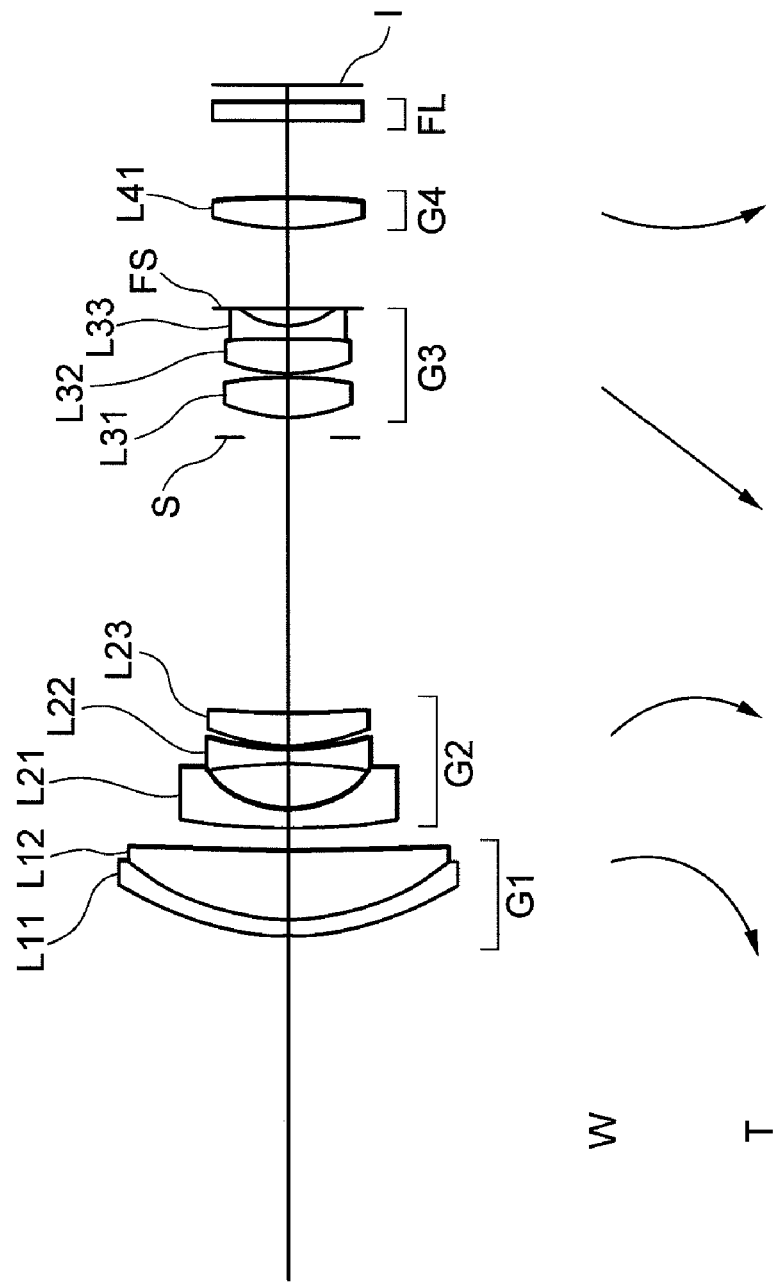

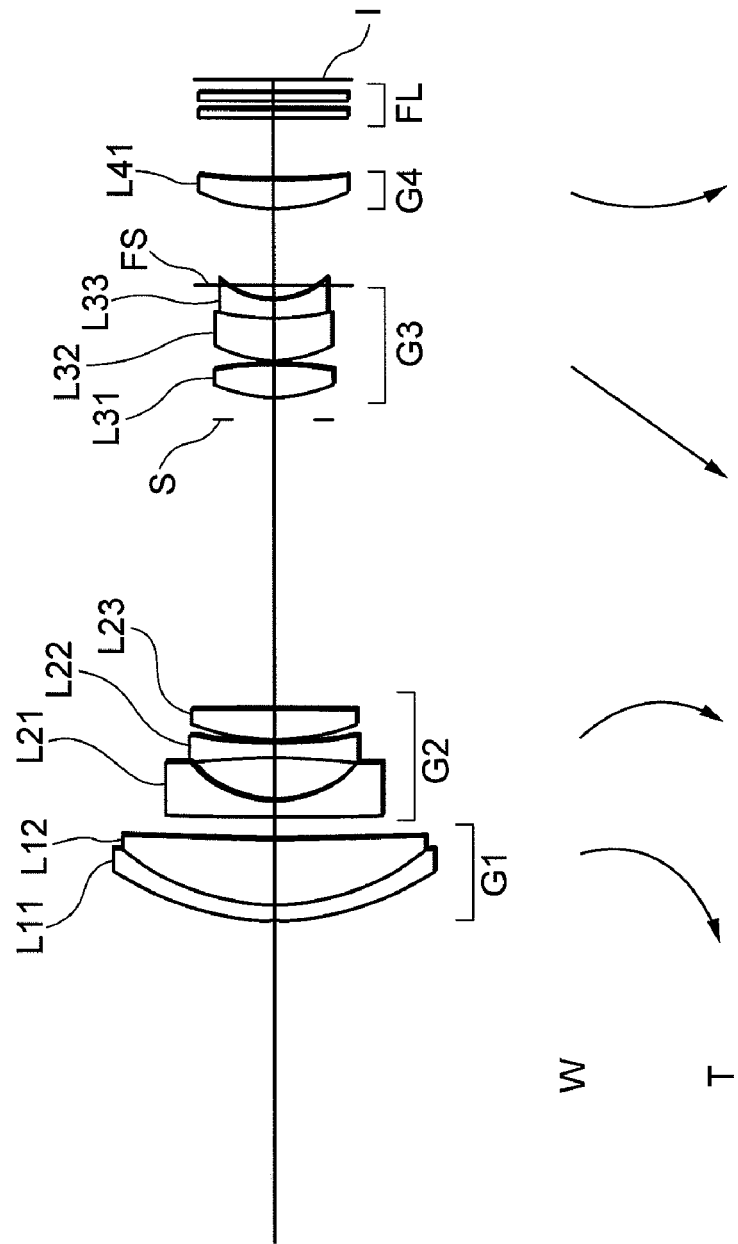

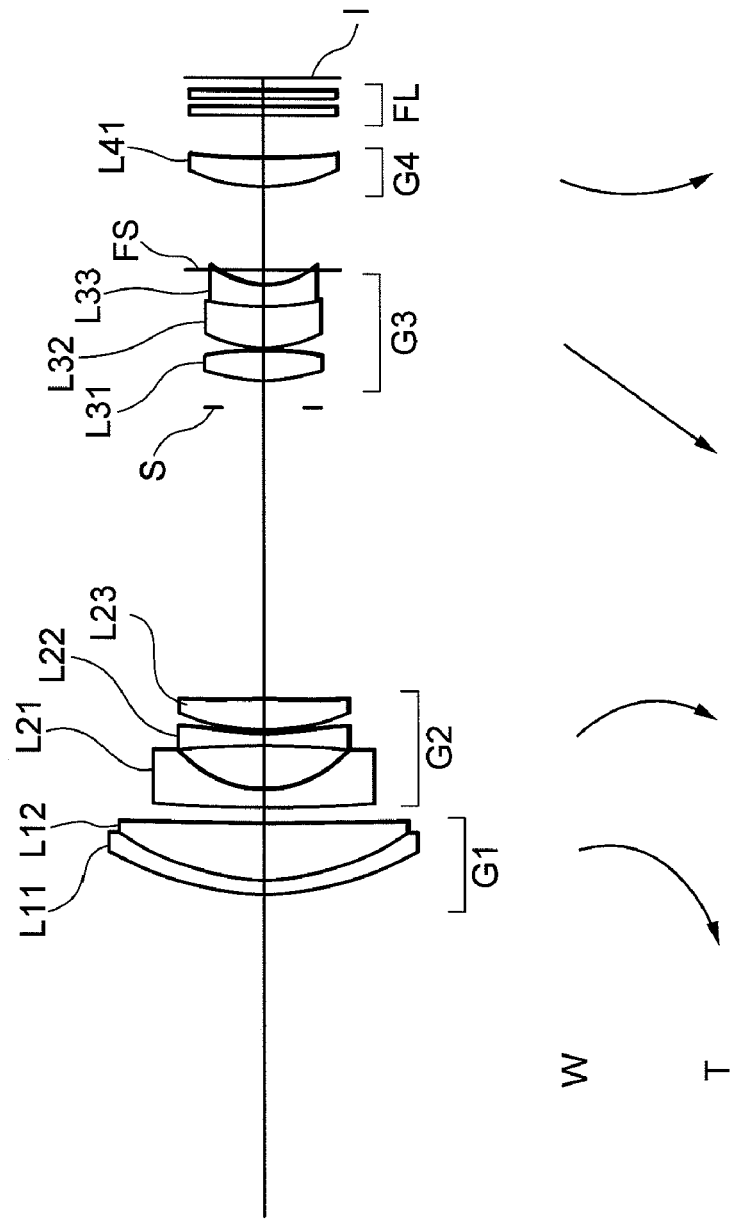

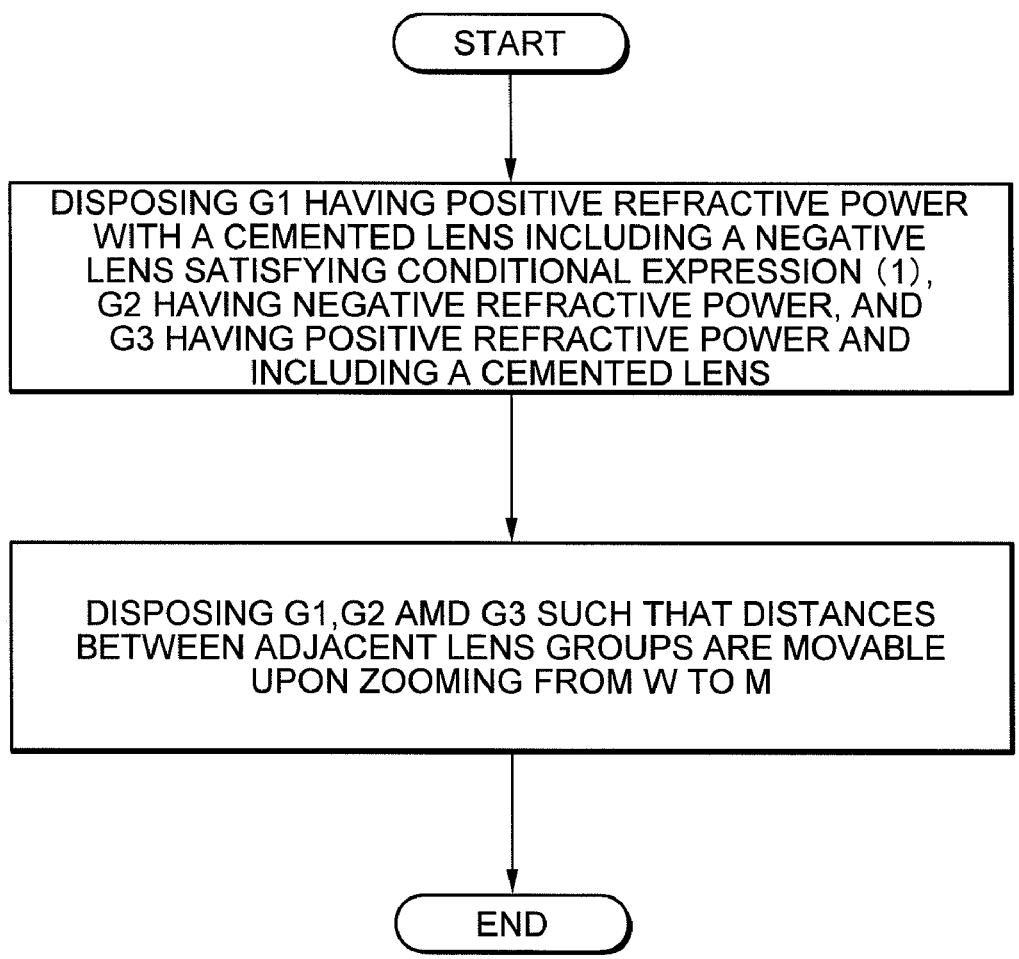

ZOOM LENS, IMAGING APPARATUS AND METHOD FOR MANUFACTURING ZOOM LENS

TECHNICAL FIELD

The present invention relates to a zoom lens, an imaging apparatus and a method for manufacturing the zoom lens.

BACKGROUND ART

Over the recent years, imaging apparatuses such as a video camera, a digital still camera, a broadcasting camera, which employ solid-state imaging device, and a film camera using a silver halide film, have hitherto been enhanced in their functions and downsized on the whole of the apparatus. Then, a zoom lens, which is short in the total lens length and has high resolution, has been required of an imaging optical system for use in such an imaging apparatus (refer to, e.g., Japanese Patent Application Laid-Open No. 2006-284753).

The conventional zoom lens has, however, a problem of not having a sufficient level of optical performance.

DISCLOSURE OF THE INVENTION

Such being the case, it is an object of the present invention, which was devised in view of the problem described above, to provide a downsized zoom lens exhibiting high optical performance, an imaging apparatus and a zoom lens manufacturing method.

To accomplish the above object, according to one aspect of the present invention, there is provided a zoom lens comprising, in order from an object side: a first lens group having positive refractive power; a second lens group having negative refractive power; and a third lens group having positive refractive power; each distance between said lens groups adjacent to each other changing upon zooming from a wide-angle end state to a telephoto end state, said first lens group having a cemented lens including a negative lens, and said third lens group having a cemented lens, and the following conditional expression (1) being satisfied:

$$1.90 < Ndn < 2.50 \quad (1)$$

where Ndn denotes a refractive index with respect to the d-line ($\lambda$=587.56 nm) of the negative lens of the first lens group.

According to another aspect of the present invention, there is provided an imaging apparatus including the zoom lens of the present application.

According to still another aspect of the present invention, there is provided a method for manufacturing a zoom lens including, in order from an object side, a first lens group, a second lens group and a third lens group, said method comprising steps of: disposing lenses of said first lens group in a way that has positive refractive power and includes a cemented lens containing a negative lens with satisfying the following conditional expression (1):

$$1.90 < Ndn < 2.50 \quad (1)$$

where Ndn denotes a refractive index with respect to the d-line ($\lambda$=587.56 nm) of the negative lens of the first lens group; disposing lenses of said second lens group so as to have negative refractive power; disposing lenses of said third lens group in a way that has positive refractive power and includes a cemented lens; and disposing said first through said third lens groups so as to make variable the distance between said lens groups adjacent to each other upon zooming from a wide-angle end state to a telephoto end state.

According to the present invention, it is possible to provide the downsized zoom lens exhibiting high optical performance, the imaging apparatus and a method for manufacturing the zoom lens.

BRIEF DESCRIPTION OF THE DRAWINGS

FIG. 1 is a sectional view of a lens configuration of a zoom lens according to Example 1 of the present application.

FIG. 3 is a sectional view of a lens configuration of the zoom lens according to Example 2 of the present application.

FIG. 9 is a sectional view of a lens configuration of the zoom lens according to Example 5 of the present application.

FIG. 13 is a flowchart showing a method for manufacturing the zoom lens of the present application.

EMBODIMENT FOR CARRYING OUT THE INVENTION

Figure 2A:
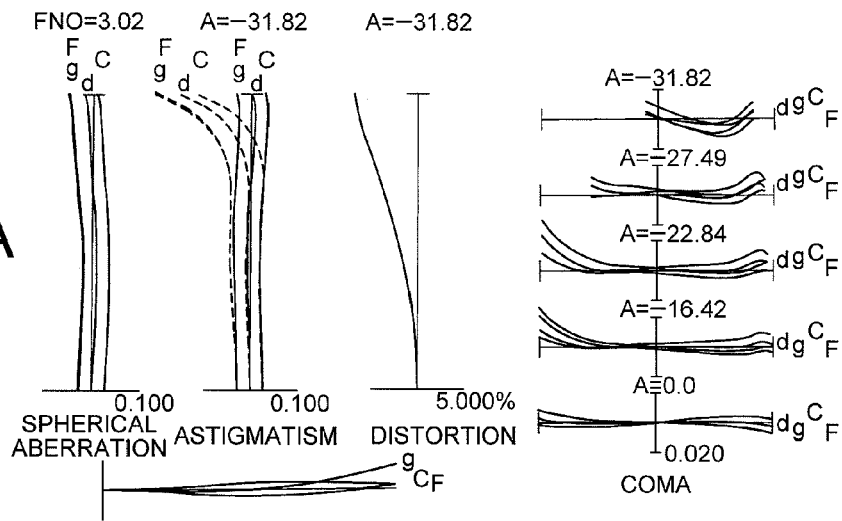
FIGS. 2A, 2B and 2C are diagrams showing various aberrations of the zoom lens according to Example 1 of the present application in an infinite-distance focusing state in a wide-angle end state, an intermediate focal length state and a telephoto end state, respectively.

A zoom lens, an imaging apparatus and a method for manufacturing the zoom lens of the present application will hereinafter be described.

A zoom lens of the present application includes, in order from an object side, a first lens group having positive refractive power, a second lens group having negative refractive power and a third lens group having positive refractive power, each distance between the lens groups adjacent to each other changes when varying a magnification from a wide-angle end state to a telephoto end state, the first lens group has a cemented lens including a negative lens, and the third lens group has a cemented lens and satisfies the following conditional expression (1):

$$1.90 < Ndn < 2.50 \quad (1)$$

where Ndn denotes a refractive index with respect to the d-line (λ=587.56 nm) of the negative lens of the first lens group.

The zoom lens of the present application is enabled to attain downsizing and higher optical performance by including a lens composed of an optical glass having a high refractive index.

Conditional expression (1) specifies the refractive index with respect to the d-line (λ=587.56 nm) of the medium of the negative lens of the first lens group.

When the value is falls below the lower limit of conditional expression (1), spherical aberration is hard to be well corrected at the telephoto end state. Note that if the lower limit value of conditional expression (1) is set to 1.92, the present invention can exhibit more of the effects.

When the value is exceeds an upper limit value of conditional expression (1), Petzval sum becomes too large, and it is difficult to correct a sagittal image plane. Note that if the upper limit value of conditional expression (1) is set to 2.20, the present invention can exhibit more effects. Further, if the upper limit value is set to 2.00, the present invention can exhibit by far more effects. If the upper limit value is set to 1.96, the present invention can exhibit the maximum effects. This configuration enables the zoom lens, which is downsized and has high imaging performance, to be realized.

Moreover, it is desirable that the zoom lens of the present application includes a fourth lens group having positive refractive power on an image side of the third lens group, and a distance between the third lens group and the fourth lens group changes upon zooming from the wide-angle end state to the telephoto end state.

With this configuration, it is feasible to preferably correct curvature of field, distortion, etc.

Further, the zoom lens of the present application satisfies, it is desirable, the following conditional expression (2) is satisfied:

$$4.50 < f1/fw < 7.00 \quad (2)$$

where f1 denotes a focal length of the first lens group; and fw denotes a focal length of the zoom lens in the wide-angle end state.

Conditional expression (2) specifies the focal length of the first lens group with respect to the focal length of the zoom lens of the present application in the wide-angle end state.

When the value falls below the lower limit value of conditional expression (2), on-axis chromatic aberration and spherical aberration get deteriorated in the telephoto end state, which is an undesirable aspect. Note that if the lower limit value of conditional expression (2) is set to 4.90, the present invention can exhibit more effects.

When the value exceeds the upper limit value of conditional expression (2), curvature of field and coma get deteriorated in the wide-angle end state, which is the undesirable aspect. Note that if the upper limit value of conditional expression (2), this is undesirable because of curvature of field and coma becoming deteriorated in the wide-angle end state. It should be noted that if the upper limit value of conditional expression (2) is set to 6.50, the present invention can exhibit more effects. Further, if the upper limit value is set to 6.00, the present invention can exhibit by far more effects, and, if the upper limit value is set to 5.60, the present invention can exhibit the maximum effects.

Moreover, it is desirable that the zoom lens of the present application satisfies the following conditional expression (3):

$$0.50 < X1/fw < 1.80 \quad (3)$$

where X1 denotes a moving amount along the optical axis of the first lens group upon zooming from the wide-angle end state to the telephoto end state; and fw denotes the focal length of the zoom lens in the wide-angle end state.

Conditional expression (3) specifies a moving amount along the optical axis of the first lens group upon zooming from the wide-angle end state to the telephoto end state with respect to the focal length of the zoom lens of the present application in the wide-angle end state.

When the value falls below the lower limit value of conditional expression (3), curvature of field becomes under-correction in the telephoto end state, which is the undesirable aspect. Note that if the lower limit value of conditional expression (3) is set to 0.60, the present invention can exhibit more effects.

When the value exceeds the upper limit value of conditional expression (3), the move quantity along the optical axis of the first lens group becomes too large, resulting in difficulties of downsizing the lens in total length and of correcting spherical aberration in the telephoto end state. It is to be noted that if the upper limit value of conditional expression (3) is set to 1.50, the present invention can exhibit more effects.

Further, it is desirable that in the zoom lens of the present application, the third lens group includes, in order from the object side, the positive lens and the cemented lens described above, and the cemented lens of the third lens group includes, in order from the object side, the positive lens and the negative lens.

This configuration enables the zoom lens of the present application to preferably correct spherical aberration and longitudinal chromatic aberration.

Moreover, it is desirable that in the zoom lens of the present application, the second lens group includes, in order from the object side, a first negative lens, a second negative lens and a positive lens.

This configuration also enables the zoom lens of the present application to well correct spherical aberration and longitudinal chromatic aberration.

Furthermore, it is desirable that in the zoom lens of the present application, an image-side surface of the first negative lens of the second lens group is an aspherical surface.

With this configuration, the zoom lens of the present application can well correct distortion in the wide-angle end state.

Further, it is desirable that in the zoom lens of the present application, the fourth lens group is constructed by one positive lens.

With this configuration, the zoom lens of the present application can be downsized and reduced in weight as well.

Still further, it is desirable that in the zoom lens of the present application, upon zooming from the wide-angle end state to the telephoto end state, a distance between the first lens group and the second lens group increases, while a distance between the second lens group and the third lens group decreases, and a distance between the third lens group and the fourth lens group increases.

This configuration enables the zoom lens of the present application to reduce a diameter of the first lens group and facilitates elevation of a zoom ratio. Then, spherical aberration can also be well corrected in the telephoto end state.

Further, it is desirable that in the zoom lens of the present application, the first lens group, the second lens group and the third lens group move on the optical axis upon zooming from the wide-angle end state to the telephoto end state.

This configuration facilitates the elevation of the zoom ratio and enables spherical aberration to be well corrected in the telephoto end state.

The zoom lens of the present application satisfies, it is desirable, the following conditional expression (4):

$$7.00 < Lw/fw < 7.80 \quad (4)$$

where Lw denotes a total lens length of the zoom lens in the wide-angle end state; and fw denotes a focal length of the zoom lens in the wide-angle end state.

Conditional expression (4) specifies the total lens length of the zoom lens in the wide-angle end state with respect to the focal length of the zoom lens in the wide-angle end state.

When the value falls below the lower limit value of conditional expression (4), the refractive power of each zoom group (each lens group which moves upon zooming from the wide-angle end state to the telephoto end state) becomes too large, resulting in the difficulty of correcting coma in the wide-angle end state. Note that the lower limit value of conditional expression (4) is set to 7.15, the present invention can exhibit more effects.

When the value exceeds the upper limit value of conditional expression (4), the total lens length of the lens elongates, resulting in the difficulty of correcting spherical aberration in the wide-angle end state. It should be noted that if the upper limit value of conditional expression (4) is set to 7.60, the present invention can exhibit by far more effects.

Moreover, it is desirable that in the zoom lens of the present application, the third lens group has an aspherical surface.

This configuration enables the zoom lens of the present application to well correct spherical aberration.

Further, it is desirable that in the zoom lens of the present application, the fourth lens group has an aspherical surface.

This configuration enables the zoom lens of the present application to well correct curvature of field.

Furthermore, an imaging apparatus is characterized by including the zoom lens having the configuration described above.

With this configuration, it is feasible to realize the downsized imaging apparatus having the high imaging forming performance.

Moreover, a method for zooming a zoom lens is a method for zooming the zoom lens of the present application, which includes, in order from an object side, a first lens group having positive refractive power, a second lens group having negative refractive power, a third lens group having positive refractive power and a fourth lens group having positive refractive power, in which each distance between the lens groups adjacent to each other changes upon zooming from a wide-angle end state to a telephoto end state, the first lens group has a cemented lens including a negative lens, the third lens group has a cemented lens, and the following conditional expression (1) is satisfied:

$$1.90 < Ndn < 2.50 \quad (1)$$

where Ndn denotes a refractive index with respect to the d-line ($\lambda$=587.56 nm) of the negative lens of the first lens group.

With this configuration, it is possible to realize the method for zooming the downsized zoom lens having high optical performance.

An outline of a method for manufacturing of the zoom lens including, in order from the object side, a first lens group, a second lens group and a third lens group, will hereinafter be described with reference to FIG. 13.

To begin with, the respective lenses are disposed within a cylindrical lens barrel so that the first lens group includes a cemented lens having positive refractive power and containing a negative lens which satisfies the following conditional expression (1):

$$1.90 < Ndn < 2.50 \quad (1);$$

the respective lenses of the second lens group are disposed so as to have negative refractive power;

the respective lenses of the third lens group are disposed in a way that has positive refractive power and includes a cemented lens; and the first lens group through the third lens group are disposed so as to enable the distances between the adjacent lens groups to change upon zooming from the wide-angle end state to the telephoto end state;

where Ndn denotes the refractive index with respect to the d-line ($\lambda$=587.56 nm) of the medium of the negative lens of the first lens group.

Further, it is desirable that the respective lenses of the zoom lens are disposed in a way that satisfies the following conditional expression (2):

$$4.50 < f1/fw < 7.00 \quad (2)$$

where f1 denotes a focal length of the first lens group; and fw denotes a focal length of the zoom lens in the wide-angle end state.

Still further, it is desirable that the respective lenses of the zoom lens are disposed in a way that satisfies the following conditional expression (3):

$$0.50 < X1/fw < 1.80 \quad (3)$$

where X1 denotes a move quantity along the optical axis of the first lens group upon zooming from the wide-angle end state to the telephoto end state; and fw denotes the focal length of the zoom lens in the wide-angle end state.

The zoom lens of the present application will hereinafter be described by way of Examples of numerical values on the basis of the accompanying drawings.

Example 1

FIG. 1 is a sectional view of a lens configuration (layout) of a zoom lens according to Example 1 of the present application.

The zoom lens according to Example 1 includes, in order from an object side, a first lens group G1 having positive refractive power, a second lens group G2 having negative refractive power, a third lens group G3 having positive refractive power and a fourth lens group G4 having positive refractive power.

The first lens group G1 is composed of, in order from the object side, a cemented lens constructed by a negative meniscus lens L11 with a convex surface directed to the object side cemented with a positive meniscus lens L12 with a convex surface directed to the object side. Note that the negative meniscus lens L11 is composed of glass of which a refractive index with respect to the d-line (wavelength $\lambda$=587.6 nm) is larger than 1.90.

The second lens group G2 is composed of, in order from the object side, a negative meniscus lens L21 with a convex surface directed to the object side, a biconcave negative lens L22 and a positive meniscus lens L23 with a convex surface directed to the object side. Note that an image side surface of the negative meniscus lens L21 is an aspherical surface.

The third lens group G3 is composed of, in order from the object side, a biconvex positive lens L31 and a cemented lens constructed by a biconvex positive lens L32 cemented with a biconcave negative lens L33. Note that an object side surface of the biconvex positive lens L31 is an aspherical surface.

The fourth lens group G4 is composed of a biconvex positive lens L41. Incidentally, the object side surface of the biconvex positive lens L41 is an aspherical surface.

In the zoom lens according to Example 1, an aperture stop S is disposed between the second lens group G2 and the third lens group G3, and a flare-cut stop FS is disposed between the third lens group G3 and the fourth lens group G4. Then, these stops S and FS move integrally with the third lens group G3 upon zooming from the wide-angle end state to the telephoto end state.

Further, a filter group FL consisting of a low-pass filter, an infrared-ray cut filter, etc is disposed between the fourth lens group G4 and an image plane I.

In the thus-constructed zoom lens according to Example 1, upon zooming from the wide-angle end state to the telephoto end state, the first lens group G1, the second lens group G2 and the third lens group G3 move along the optical axis so that the distance between the first lens group G1 and the second lens group G2 increases, the distance between the second lens group G2 and the third lens group G3 decreases, and the distance between the third lens group G3 and the fourth lens group G4 increases.

The following Table 1 shows values of various items of data of the zoom lens according to Example 1 of the present application.

In the Table 1, f represents a focal length, and BF indicates a back focal length.

In [Surface Data], a surface number denotes an order of the lens surface counted from the object side, r denotes a radius of curvature of the lens surface, d denotes an on-axis gap of the lens surface, nd denotes a refractive index with respect to the d-line (wavelength λ=587.6 nm), vd denotes Abbe number with respect to the d-line (wavelength λ=587.56 nm), respectively. Further, "Object Surface" designates a surface of the object, "Variable" denotes a variable surface gap, (Stop S) indicates an aperture stop S, (Stop FS) indicates a flare-cut stop FS, and an "Image plane" represents an image plane I, respectively. Note that "∞" of the radius-of-curvature r indicates a flat surface. Moreover, the lens surface, if classified as the aspherical surface, is marked with "*", and a paraxial radius of curvature is given in the column of the radius of curvature.

An aspherical surface coefficient and a cone constant are shown in [Aspherical Surface Data] with respect to the aspherical surface given in [Surface Data] in the case of expressing a shape thereof in the following expression:

$$S(y)=(y^2/R)/[1+(1-K\cdot y^2/R^2)^{1/2}]+A4\cdot y^4+A6\cdot y^6+A8\cdot y^8+A10\cdot y^{10}$$

where S(y) is a distance (sag amount) along the direction of the optical axis from a tangent plane of a vertex of each aspherical surface at a height y from the optical axis in the vertical direction, R is a radius of curvature (paraxial radius of curvature) of the reference sphere, k is a conical coefficient, and A4, A6, A8 A10 are set as aspherical coefficients. Incidentally, the description of the aspherical coefficient of "0" (zero) is omitted. Note that [E-n] represents [×10-n], in which [1.234E-05] connotes [1.234×10-5].

In [Specifications], FNO represents an f-number, 2ω denotes an angle of view (angle of coverage), Y stands for an image height, TL represents a total lens length, and di (i: integer) indicates a variable surface distance of the i-th surface, respectively. It is to be noted that W denotes a wide-angle end state, M denotes an intermediate focal length state, and T denotes a telephoto end state, respectively.

Herein, the focal length f, the radius-of-curvature r and other items of data involve using generally [mm] as the unit of the length. The optical system, however, acquires the equal optical performance even when proportionally enlarged or reduced and is not therefore limited to this unit.

Note that the symbols described above in the Table 1 are to be used in the same way in the Tables of the respective Examples which will be discussed later on.

TABLE 1

Example 1

[Surface Data]

| Surface Number | r | d | nd | vd |
|---|---|---|---|---|
| object | ∞ | | | |
| 1) | 17.5627 | 0.9000 | 1.922860 | 20.88 |
| 2) | 14.1701 | 3.9000 | 1.640000 | 60.21 |
| 3) | 127.4165 | variable | 1.000000 | |
| 4) | 47.1921 | 1.0000 | 1.806100 | 40.88 |
| *5) | 6.0091 | 2.7000 | 1.000000 | |
| 6) | −23.5464 | 0.8000 | 1.754998 | 52.32 |
| 7) | 15.3863 | 0.2000 | 1.000000 | |
| 8) | 11.0890 | 2.0000 | 1.808095 | 22.76 |
| 9) | 478.8128 | variable | 1.000000 | |
| 10) (S) | ∞ | 1.1500 | 1.000000 | |
| *11) | 8.4740 | 2.3000 | 1.589130 | 61.18 |
| 12) | −20.3873 | 0.2000 | 1.000000 | |
| 13) | 9.4093 | 2.0000 | 1.804000 | 46.57 |
| 14) | −38.2290 | 0.8000 | 1.728250 | 28.46 |
| 15) | 5.0271 | 1.0000 | 1.000000 | |
| 16) (FS) | ∞ | variable | 1.000000 | |
| *17) | 15.5789 | 1.7000 | 1.514730 | 63.86 |
| 18) | −81.1912 | variable | 1.000000 | |
| 19) | ∞ | 1.0530 | 1.516330 | 64.14 |
| 20) | ∞ | BF | 1.000000 | |
| image plne | ∞ | | | |

[Aspherical Surface Data]

Surface number = 5

| κ = | 0.1204 |
|---|---|
| A4 = | 4.79980E−04 |
| A6 = | 1.71200E−05 |
| A8 = | −2.94550E−07 |
| A10 = | 1.79160E−08 |

Surface number = 11

| κ = | −0.9399 |
|---|---|
| A4 = | −1.24470E−07 |
| A6 = | 1.11480E−05 |
| A8 = | −1.71350E−06 |
| A10 = | 8.25590E−08 |

Surface number = 17

| κ = | −0.8261 |
|---|---|
| A4 = | −7.79540E−05 |
| A6 = | 5.31310E−06 |
| A8 = | −2.80520E−07 |
| A10 = | 4.63620E−09 |

[Specifications]
Zoom Ratio = 4.713

| | W | M | T |
|---|---|---|---|
| f = | 6.48900 | 14.08743 | 30.58339 |
| FNO = | 3.01 | 3.65 | 5.35 |
| 2ω = | 63.6° | 29.4° | 13.6° |
| Y = | 3.75 | 3.75 | 3.75 |
| TL = | 48.80759 | 50.41897 | 58.50411 |
| BF = | 1.06984 | 1.05699 | 1.03191 |
| d3 = | 1.38393 | 7.18641 | 10.16713 |
| d9 = | 15.77947 | 7.31912 | 2.35477 |

TABLE 1-continued

Example 1

| | | | |
|---|---|---|---|
| d16 = | 4.55368 | 7.45583 | 18.92418 |
| d18 = | 4.31104 | 5.69762 | 4.31650 |

[Lens Group Data]

| Group | I | Focal Length |
|---|---|---|
| 1 | 1 | 34.99973 |
| 2 | 4 | −8.05192 |
| 3 | 11 | 11.97090 |
| 4 | 17 | 25.54613 |

[Values for Conditional Expressions]

| | |
|---|---|
| (1) Ndn = | 1.92286 |
| (2) f1/fw = | 5.394 |
| (3) X1/fw = | 1.4975 |
| (4) Lw/fw = | 7.522 |

I: start surface number of each lens group

Figure 2B:
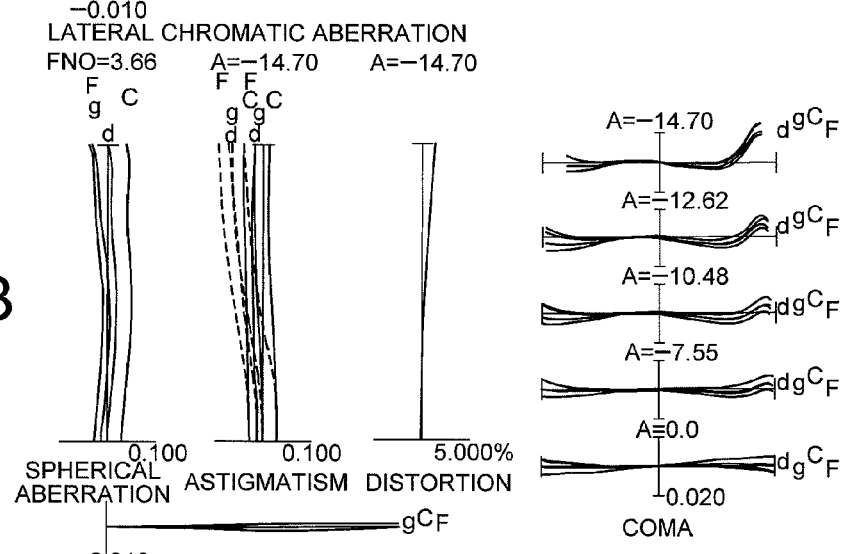
Figure 2C:
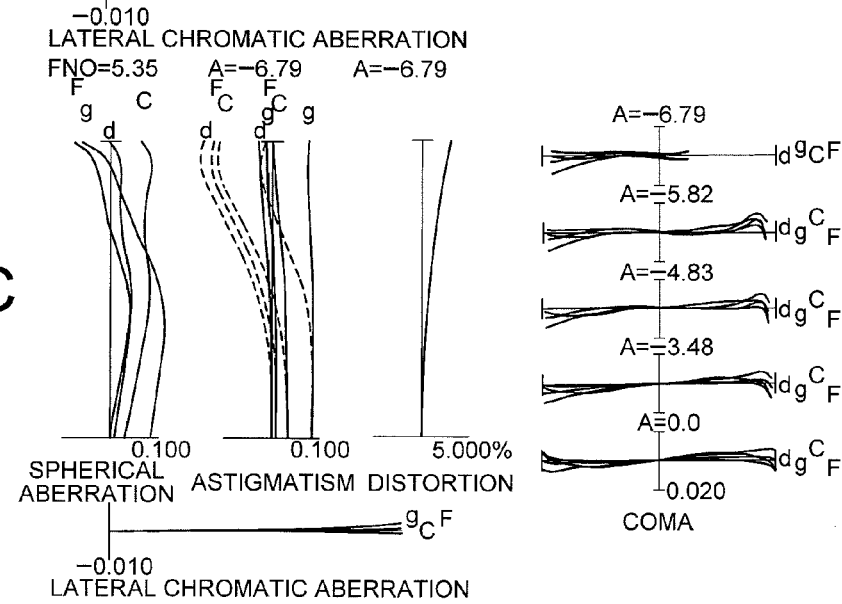

FIGS. 2A, 2B and 2C are diagrams showing various aberrations of the zoom lens according to Example 1 of the present application in an infinite-distance focusing state in the wide-angle end state, the intermediate focal length state and the telephoto end state, respectively.

It is understood from FIGS. 2A, 2B and 2C that the zoom lens according to Example 1 preferably corrects the various aberrations in a way that ranges from the wide-angle end state to the telephoto end state, and exhibits the outstanding optical performance.

Note that FNO represents f-number, and A denotes a half angle of view respectively in FIGS. 2A, 2B and 2C. Further, in each of FIGS. 2A, 2B and 2C, the diagram of spherical aberration shows a value of the f-number corresponding to the maximum aperture, the diagram of astigmatism and the diagram of distortion show the maximum values of the half angle of view, and the diagram of coma shows respective values of a half angle of view. Then, d represents the d-line ($\lambda$=587.56 nm), g designates the g-line ($\lambda$=435.8 nm), C denotes the C-line (wavelength $\lambda$=656.3 nm), and F represents the F-line (wavelength $\lambda$=486.1 nm), respectively. Moreover, in the diagrams of astigmatism in FIGS. 2A, 2B and 2C, a solid line shows a sagittal image plane, and a broken line shows a meridional image plane, respectively. Note that the same symbols as those in Example 1 are to be employed also in the diagrams showing the various aberrations in Examples which will be illustrated as below.

Example 2

FIG. 3 is a sectional view of a lens configuration of a zoom lens according to Example 2 of the present application.

The zoom lens according to Example 2 includes, in order from the object side, a first lens group G1 having positive refractive power, a second lens group G2 having negative refractive power, a third lens group G3 having positive refractive power and a fourth lens group G4 having positive refractive power.

The first lens group G1 is composed of, in order from the object side, a cemented lens constructed by a negative meniscus lens L11 with a convex surface directed to the object side cemented with a positive meniscus lens L12 with a convex surface directed to the object side. Note that the negative meniscus lens L11 is composed of a glass of which the refractive index with respect to the d-line (wavelength $\lambda$=587.6 nm) is larger than 1.90.

The second lens group G2 is composed of, in order from the object side, a negative meniscus lens L21 with a convex surface directed to the object side, a biconcave negative lens L22 and a positive meniscus lens L23 with a convex surface directed to the object side. Note that the image-sided surface of the negative meniscus lens L21 is an aspherical surface.

The third lens group G3 is composed of, in order from the object side, a biconvex positive lens L31 and a cemented lens constructed by a positive meniscus lens L32 with a convex surface directed to the object side cemented with a negative meniscus lens L33 with a convex surface directed to the object side. Note that the object-sided surface of the biconvex positive lens L31 is an aspherical surface.

The fourth lens group G4 is composed of a positive meniscus lens L41 with a convex surface directed to the object side. Incidentally, the object-sided surface of the positive meniscus lens L41 is an aspherical surface.

In the zoom lens according to Example 2, an aperture stop S is disposed between the second lens group G2 and the third lens group G3, and a flare-cut stop FS is disposed between the third lens group G3 and the fourth lens group G4. Then, these stops S and FS move integrally with the third lens group G3 upon zooming from the wide-angle end state to the telephoto end state. Further, a filter group FL consisting of a low-pass filter, an infrared-ray cut filter, etc is disposed between the fourth lens group G4 and the image plane I.

In the thus-constructed zoom lens according to Example 2, upon zooming from the wide-angle end state to the telephoto end state, the first lens group G1, the second lens group G2 and the third lens group G3 move along the optical axis so that a distance between the first lens group G1 and the second lens group G2 increases, a distance between the second lens group G2 and the third lens group G3 decreases, and a distance between the third lens group G3 and the fourth lens group G4 increases.

The following Table 2 shows the values of the various items of data of the zoom lens according to Example 2 of the present application.

TABLE 2

Example 2

[Surface Data]

| Surface Number | r | d | nd | vd |
|---|---|---|---|---|
| object | ∞ | | | |
| 1) | 19.1719 | 0.9000 | 1.922860 | 20.88 |
| 2) | 15.1685 | 3.6000 | 1.640000 | 60.20 |
| 3) | 273.4170 | variable | 1.000000 | |
| 4) | 149.2271 | 1.0000 | 1.806100 | 40.88 |
| *5) | 6.5113 | 2.7000 | 1.000000 | |
| 6) | −31.6335 | 0.8000 | 1.754998 | 52.32 |
| 7) | 22.9924 | 0.2000 | 1.000000 | |
| 8) | 12.5695 | 1.9000 | 1.808095 | 22.76 |
| 9) | 308.9382 | variable | 1.000000 | |
| 10) (S) | ∞ | 1.5000 | 1.000000 | |
| *11) | 9.5464 | 1.8619 | 1.589130 | 61.18 |
| 12) | −19.6098 | 0.2000 | 1.000000 | |
| 13) | 6.5960 | 2.6000 | 1.496999 | 81.54 |
| 14) | 16.0145 | 1.0000 | 1.805181 | 25.42 |
| 15) | 4.7467 | 1.0000 | 1.000000 | |
| 16) (FS) | ∞ | variable | 1.000000 | |
| *17) | 10.6932 | 1.7000 | 1.516330 | 64.06 |
| 18) | 66.4488 | variable | 1.000000 | |
| 19) | ∞ | 0.5530 | 1.544370 | 70.51 |
| 20) | ∞ | 0.5130 | 1.000000 | |
| 21) | ∞ | 0.5000 | 1.516330 | 64.14 |
| 22) | ∞ | BF | 1.000000 | |

TABLE 2-continued

Example 2

[Aspherical Surface Data]

Surface number = 5

κ = −2.3094
A4 = 1.48730E−03
A6 = −2.10070E−05
A8 = 6.44450E−07
A10 = −5.10190E−09

Surface number = 11

κ = 0.4779
A4 = −2.03480E−04
A6 = 7.56130E−06
A8 = −1.49140E−06
A10 = 9.90580E−08

Surface number = 17

κ = 4.6827
A4 = −4.69160E−04
A6 = −1.80560E−05
A8 = 8.24810E−07
A10 = −5.36670E−08

[Specifications]
Zoom Ratio = 4.695

| | W | M | T |
|---|---|---|---|
| f = | 7.00400 | 14.00000 | 32.88298 |
| FNO = | 3.65 | 4.25 | 5.82 |
| 2ω = | 63.7° | 31.8° | 13.5° |
| Y = | 4.05 | 4.05 | 4.05 |
| TL = | 50.31075 | 50.58228 | 56.983 |
| BF = | 0.61701 | 0.60000 | 0.58300 |
| d3 = | 1.20000 | 7.06161 | 12.15828 |
| d9 = | 17.52768 | 8.65222 | 2.00920 |
| d16 = | 4.71823 | 6.52061 | 15.48467 |
| d18 = | 3.71992 | 5.21992 | 4.21992 |

[Lens Group Data]

| Group | I | Focal Length |
|---|---|---|
| 1 | 1 | 36.00480 |
| 2 | 4 | −9.31061 |
| 3 | 11 | 12.71852 |
| 4 | 17 | 24.42822 |

[Values for Conditional Expressions]

(1) Ndn = 1.92286
(2) f1/fw = 5.141
(3) X1/fw = 0.9526
(4) Lw/fw = 7.183

I: start surface number of each lens group

Figure 4A:
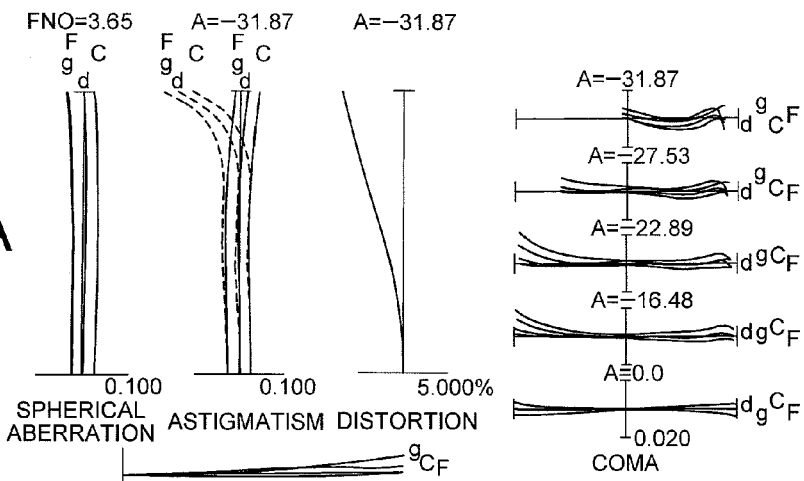
FIGS. 4A, 4B and 4C are diagrams showing the various aberrations of the zoom lens according to Example 2 of the present application in the infinite-distance focusing state in the wide-angle end state, the intermediate focal length state and the telephoto end state, respectively.
Figure 4B:
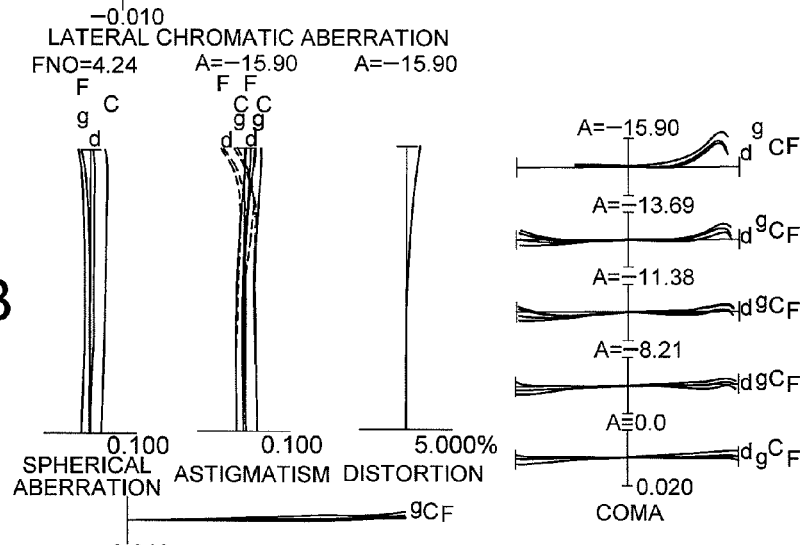
Figure 4C:
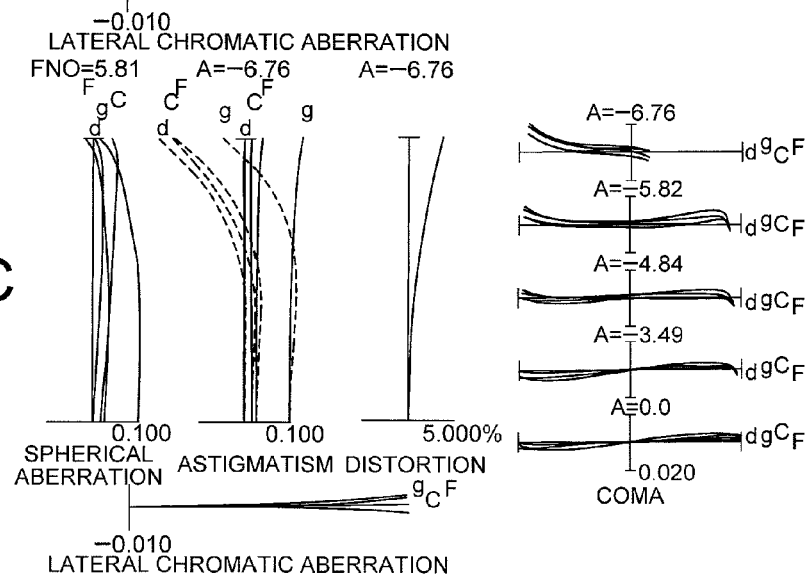

FIGS. 4A, 4B and 4C are diagrams showing the various aberrations of the zoom lens according to Example 2 of the present application in the infinite-distance focusing state in the wide-angle end state, the intermediate focal length state and the telephoto end state, respectively.

It is understood from FIGS. 4A, 4B and 4C that the zoom lens according to Example 2 preferably corrects the various aberrations in a way that ranges from the wide-angle end state to the telephoto end state, and exhibits the outstanding optical performance.

Example 3

Figure 5:
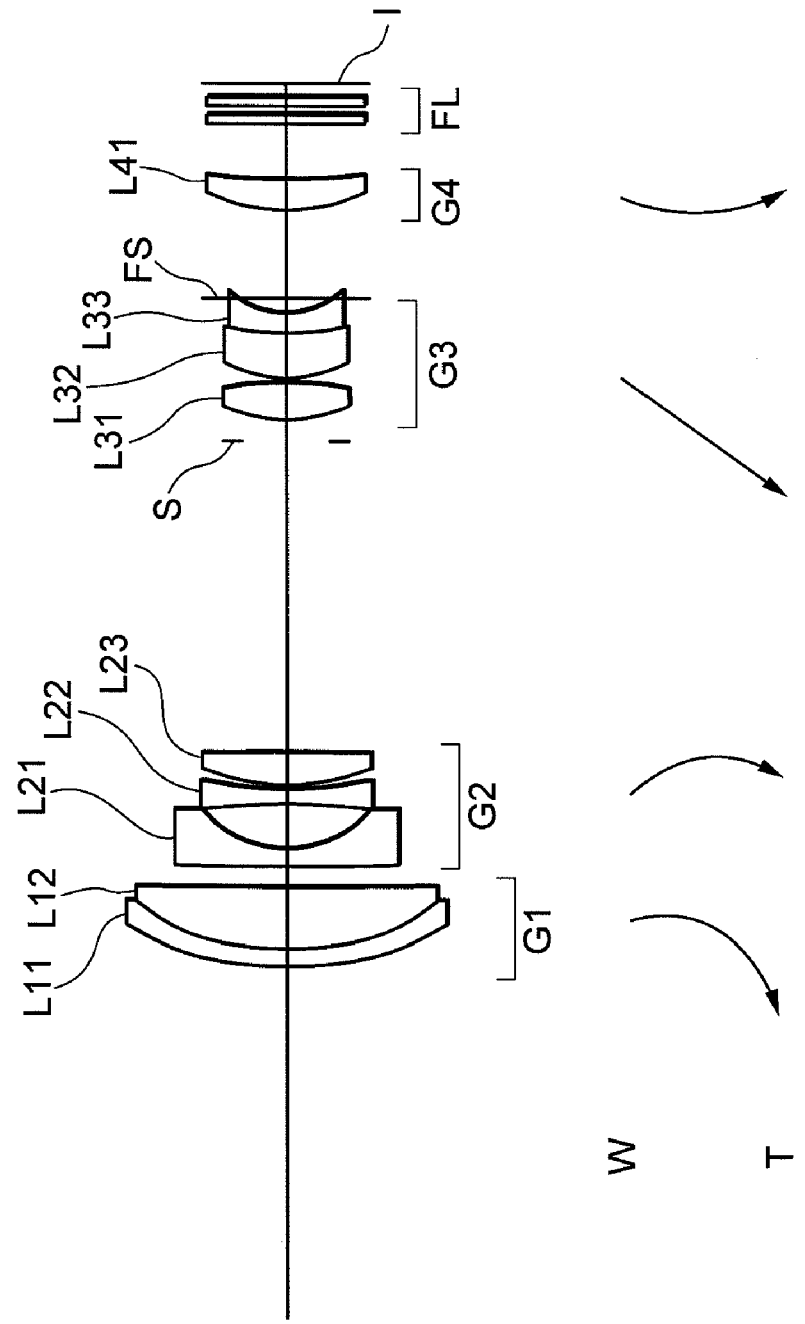
FIG. 5 is a sectional view of a lens configuration of the zoom lens according to Example 3 of the present application.

FIG. 5 is a sectional view of a lens configuration of a zoom lens according to Example 3 of the present application.

The zoom lens according to Example 3 includes, in order from the object side, a first lens group G1 having positive refractive power, a second lens group G2 having negative refractive power, a third lens group G3 having positive refractive power and a fourth lens group G4 having positive refractive power.

The first lens group G1 is composed of, in order from the object side, a cemented lens constructed by a negative meniscus lens L11 with a convex surface directed to the object side cemented with a positive meniscus lens L12 with a convex surface directed to the object side. Note that the negative meniscus lens L11 is composed of a glass of which the refractive index with respect to the d-line (wavelength λ=587.6 nm) is larger than 1.90.

The second lens group G2 is composed of, in order from the object side, a negative meniscus lens L21 with a convex surface directed to the object side, a biconcave negative lens L22 and a positive meniscus lens L23 with a convex surface directed to the object side. Note that the image-sided surface of the negative meniscus lens L21 is an aspherical surface.

The third lens group G3 is composed of, in order from the object side, a biconvex positive lens L31 and a cemented lens constructed by a positive meniscus lens L32 with a convex surface directed to the object side cemented with a negative meniscus lens L33 with a convex surface directed to the object side. Note that the object-sided surface of the biconvex positive lens L31 is an aspherical surface.

The fourth lens group G4 is composed of a positive meniscus lens L41 with a convex surface directed to the object side. Incidentally, the object side surface of the positive meniscus lens L41 is an aspherical surface.

In the zoom lens according to Example 3, an aperture stop S is disposed between the second lens group G2 and the third lens group G3, and a flare-cut stop FS is disposed between the third lens group G3 and the fourth lens group G4. Then, these stops S and FS move integrally with the third lens group G3 upon zooming from the wide-angle end state to the telephoto end state. Further, a filter group FL consisting of a low-pass filter, an infrared-ray cut filter, etc is disposed between the fourth lens group G4 and the image plane I.

In the thus-constructed zoom lens according to Example 3, upon zooming from the wide-angle end state to the telephoto end state, the first lens group G1, the second lens group G2 and the third lens group G3 move along the optical axis so that a distance between the first lens group G1 and the second lens group G2 increases, a distance between the second lens group G2 and the third lens group G3 decreases, and the distance between the third lens group G3 and the fourth lens group G4 increases.

The following Table 3 shows the values of the various items of data of the zoom lens according to Example 3 of the present application.

TABLE 3

Example 3

[Surface Data]

| Surface Number | r | d | nd | νd |
|---|---|---|---|---|
| object | ∞ | | | |
| 1) | 19.3781 | 0.9000 | 1.922860 | 20.88 |
| 2) | 15.1303 | 3.6000 | 1.640000 | 60.20 |
| 3) | 1360.2495 | variable | 1.000000 | |
| 4) | 856.4488 | 1.0000 | 1.806100 | 40.88 |
| *5) | 6.5490 | 2.6000 | 1.000000 | |
| 6) | −42.1238 | 0.7000 | 1.754998 | 52.32 |
| 7) | 20.0242 | 0.2000 | 1.000000 | |
| 8) | 11.7248 | 1.9000 | 1.808095 | 22.76 |

TABLE 3-continued

Example 3

| | | | | |
|---|---|---|---|---|
| 9) | 136.4165 | variable | 1.000000 | |
| 10) (S) | ∞ | 1.5000 | 1.000000 | |
| *11) | 9.5506 | 1.9000 | 1.589130 | 61.18 |
| 12) | −18.7188 | 0.2000 | 1.000000 | |
| 13) | 6.6527 | 2.7000 | 1.496999 | 81.54 |
| 14) | 16.3792 | 1.0000 | 1.805181 | 25.42 |
| 15) | 4.7142 | 1.0000 | 1.000000 | |
| 16) (FS) | ∞ | variable | 1.000000 | |
| *17) | 10.2245 | 1.7000 | 1.516330 | 64.06 |
| 18) | 48.5006 | variable | 1.000000 | |
| 19) | ∞ | 0.5530 | 1.544370 | 70.51 |
| 20) | ∞ | 0.5130 | 1.000000 | |
| 21) | ∞ | 0.5000 | 1.516330 | 64.14 |
| 22) | ∞ | BF | 1.000000 | |

[Aspherical Surface Data]

Surface number = 5

| | |
|---|---|
| κ = | 0.3865 |
| A4 = | 2.63800E−04 |
| A6 = | 4.58160E−06 |
| A8 = | 2.63520E−08 |
| A10 = | 1.90530E−09 |

Surface number = 11

| | |
|---|---|
| κ = | 0.5467 |
| A4 = | −2.25580E−04 |
| A6 = | 8.33200E−06 |
| A8 = | −1.70340E−06 |
| A10 = | 1.14030E−07 |

Surface number = 17

| | |
|---|---|
| κ = | 4.2076 |
| A4 = | −4.72180E−04 |
| A6 = | −1.60940E−05 |
| A8 = | 6.43130E−07 |
| A10 = | −4.77060E−08 |

[Specifications]
Zoom Ratio = 4.695

| | W | M | T |
|---|---|---|---|
| f = | 7.00400 | 14.00000 | 32.88298 |
| FNO = | 3.65 | 4.29 | 5.94 |
| 2ω = | 63.8° | 31.7° | 13.5° |
| Y = | 4.05 | 4.05 | 4.05 |
| TL = | 50.19397 | 49.86559 | 55.983 |
| BF = | 0.61701 | 0.60000 | 0.58300 |
| d3 = | 1.20000 | 6.44583 | 11.21094 |
| d9 = | 17.68973 | 8.64336 | 2.02068 |
| d16 = | 5.06505 | 7.05421 | 16.04619 |
| d18 = | 3.15619 | 4.65619 | 3.65619 |

[Lens Group Data]

| Group | I | Focal Length |
|---|---|---|
| 1 | 1 | 34.58296 |
| 2 | 4 | −9.17092 |
| 3 | 11 | 12.45658 |
| 4 | 17 | 24.71802 |

[Values for Conditional Expressions]

| | |
|---|---|
| (1) Ndn = | 1.92286 |
| (2) f1/fw = | 4.938 |
| (3) X1/fw = | 0.8265 |
| (4) Lw/fw = | 7.166 |

I: start surface number of each lens group

Figure 6A:
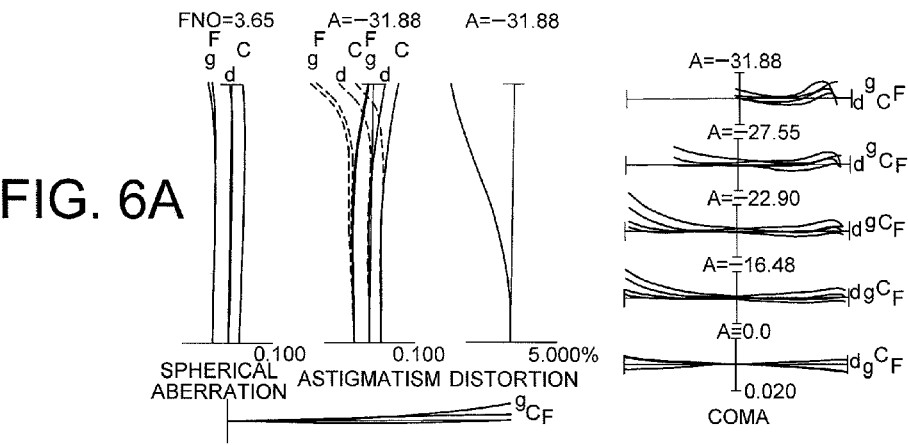
FIGS. 6A, 6B and 6C are diagrams showing the various aberrations of the zoom lens according to Example 3 of the present application in the infinite-distance focusing state in the wide-angle end state, the intermediate focal length state and the telephoto end state, respectively.
Figure 6B:
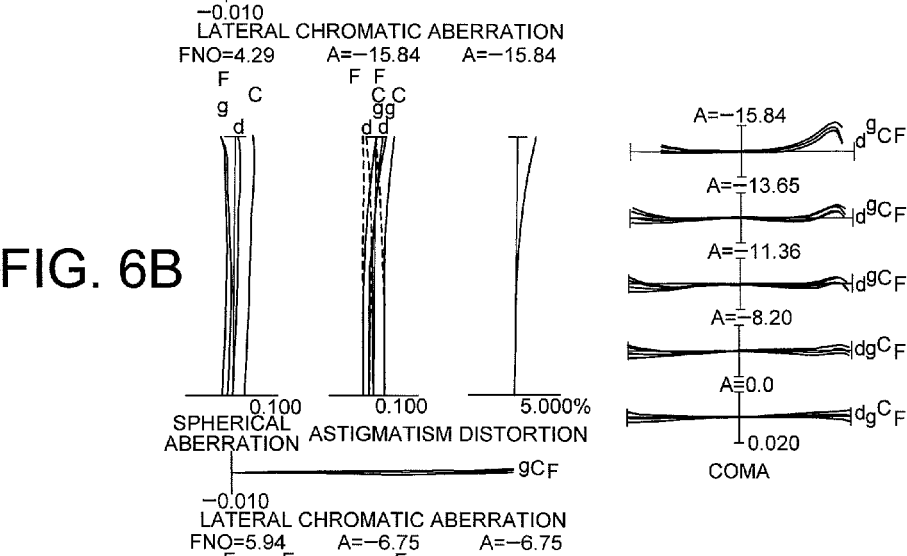
Figure 6C:
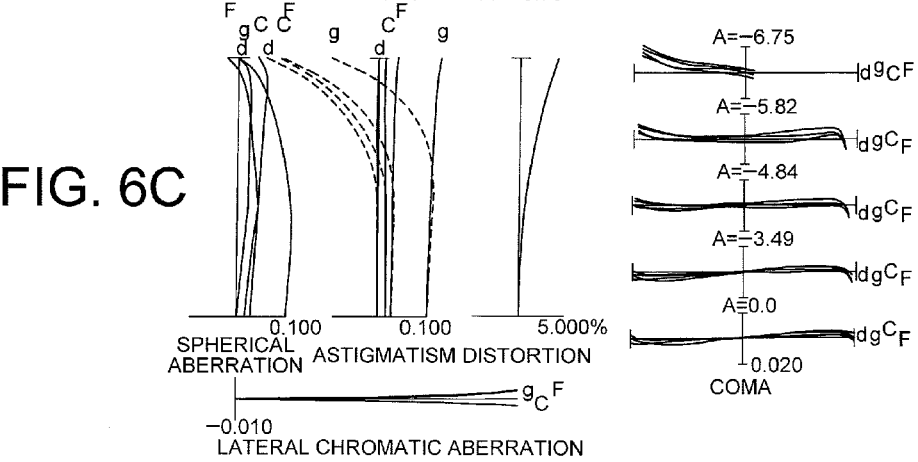

FIGS. 6A, 6B and 6C are diagrams showing the various aberrations of the zoom lens according to Example 3 of the present application in the infinite-distance focusing state in the wide-angle end state, the intermediate focal length state and the telephoto end state, respectively.

It is understood from FIGS. 6A, 6B and 6C that the zoom lens according to Example 3 preferably corrects the various aberrations in a way that ranges from the wide-angle end state to the telephoto end state, and exhibits the outstanding optical performance.

Example 4

Figure 7:
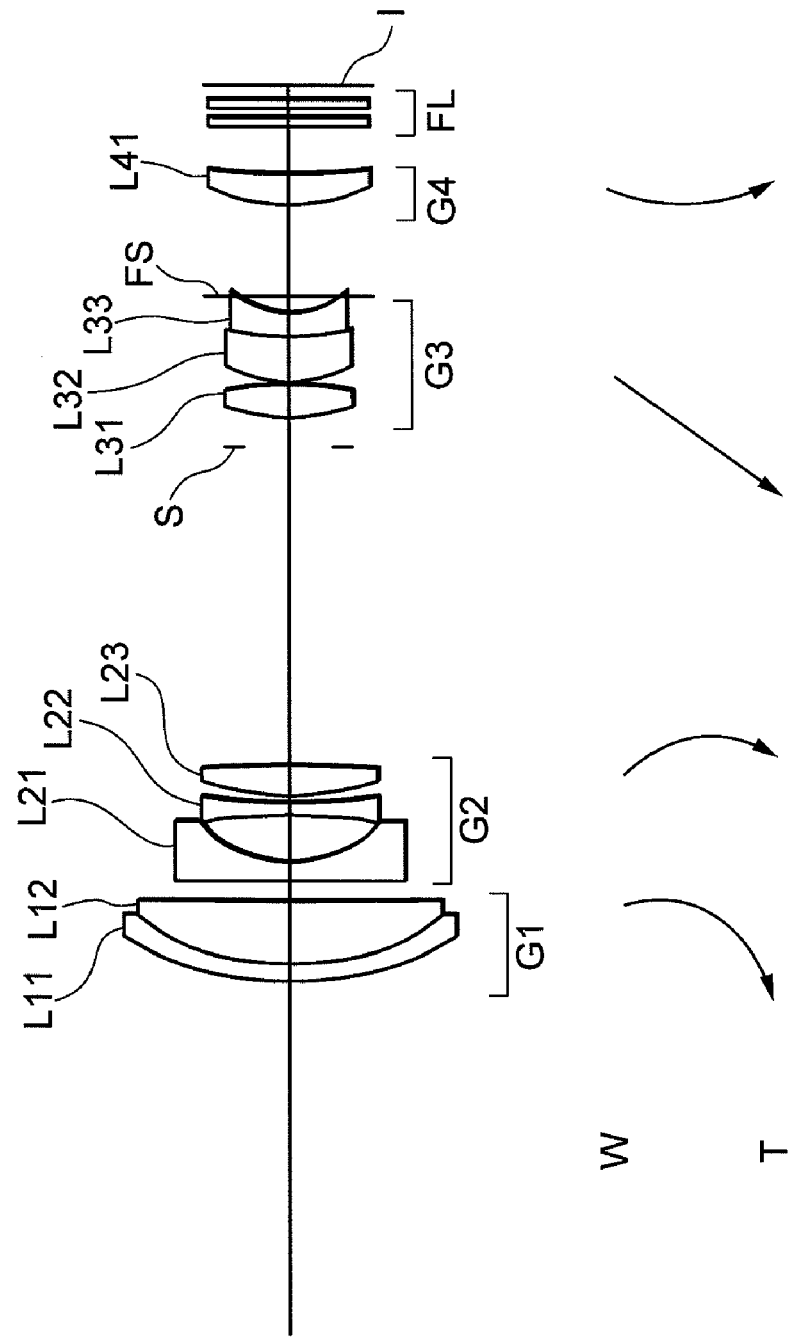
FIG. 7 is a sectional view of a lens configuration of the zoom lens according to Example 4 of the present application.

FIG. 7 is a sectional view of a lens configuration of a zoom lens according to Example 4 of the present application.

The zoom lens according to Example 4 includes, in order from the object side, a first lens group G1 having positive refractive power, a second lens group G2 having negative refractive power, a third lens group G3 having positive refractive power and a fourth lens group G4 having positive refractive power.

The first lens group G1 is composed of, in order from the object side, the cemented lens of the negative meniscus lens L11 with the convex surface directed to the object side and the positive meniscus lens L12 with the convex surface directed to the object side. Note that the negative meniscus lens L11 is composed of the glass of which the refractive index with respect to the d-line (wavelength λ=587.6 nm) is larger than 1.90.

The second lens group G2 is composed of, in order from the object side, a negative meniscus lens L21 with a convex surface directed to the object side, a biconcave negative lens L22 and a biconvex positive lens L23. Note that the image-sided surface of the negative meniscus lens L21 is an aspherical surface.

The third lens group G3 is composed of, in order from the object side, a biconvex positive lens L31 and a cemented lens constructed by a positive meniscus lens L32 with a convex surface directed to the object side cemented with a negative meniscus lens L33 with a convex surface directed to the object side. Note that the object-sided surface of the biconvex positive lens L31 is an aspherical surface.

The fourth lens group G4 is composed of a positive meniscus lens L41 with a convex surface directed to the object side. Incidentally, the object-sided surface of the positive meniscus lens L41 is an aspherical surface.

In the zoom lens according to Example 4, an aperture stop S is disposed between the second lens group G2 and the third lens group G3, and a flare-cut stop FS is disposed between the third lens group G3 and the fourth lens group G4. Then, these stops S and FS move integrally with the third lens group G3 upon zooming from the wide-angle end state to the telephoto end state. Further, a filter group FL consisting of a low-pass filter, an infrared-ray cut filter, etc is disposed between the fourth lens group G4 and the image plane I.

In the thus-constructed zoom lens according to Example 4, upon zooming from the wide-angle end state to the telephoto end state, the first lens group G1, the second lens group G2 and the third lens group G3 move along the optical axis so that a distance between the first lens group G1 and the second lens group G2 increases, a distance between the second lens group G2 and the third lens group G3 decreases, and a distance between the third lens group G3 and the fourth lens group G4 increases.

The following Table 4 shows the values of the various items of data of the zoom lens according to Example 4 of the present application.

TABLE 4

Example 4

[Surface Data]

| Surface Number | r | d | nd | vd |
|---|---|---|---|---|
| object | ∞ | | | |
| 1) | 18.7774 | 0.9000 | 1.922860 | 20.88 |
| 2) | 14.8285 | 3.5000 | 1.640000 | 60.20 |
| 3) | 327.5331 | variable | 1.000000 | |
| 4) | 207.8041 | 1.0000 | 1.806100 | 40.88 |
| *5) | 6.6834 | 2.8000 | 1.000000 | |
| 6) | −23.8292 | 0.7000 | 1.754998 | 52.32 |
| 7) | 30.7044 | 0.2000 | 1.000000 | |
| 8) | 13.8862 | 1.8000 | 1.808095 | 22.76 |
| 9) | −571.0644 | variable | 1.000000 | |
| 10) (S) | ∞ | 1.5000 | 1.000000 | |
| *11) | 9.4106 | 1.7000 | 1.589130 | 61.18 |
| 12) | −17.5360 | 0.2000 | 1.000000 | |
| 13) | 6.5909 | 2.7000 | 1.497820 | 82.52 |
| 14) | 33.7951 | 1.2000 | 1.795041 | 28.69 |
| 15) | 4.6390 | 1.0000 | 1.000000 | |
| 16) (FS) | ∞ | variable | 1.000000 | |
| *17) | 10.8254 | 1.7000 | 1.516330 | 64.06 |
| 18) | 77.6555 | variable | 1.000000 | |
| 19) | ∞ | 0.5530 | 1.544370 | 70.51 |
| 20) | ∞ | 0.5130 | 1.000000 | |
| 21) | ∞ | 0.5000 | 1.516330 | 64.14 |
| 22) | ∞ | BF | 1.000000 | |

[Aspherical Surface Data]

Surface number = 5

κ = −1.6659
A4 = 1.11460E−03
A6 = −7.40700E−06
A8 = 2.79370E−07
A10 = −8.40530E−10

Surface number = 11

κ = 0.4161
A4 = −2.21620E−04
A6 = 1.07680E−05
A8 = −2.10040E−06
A10 = 1.39160E−07

Surface number = 17

κ = 4.9697
A4 = −4.93780E−04
A6 = −1.50460E−05
A8 = 5.73090E−07
A10 = −5.22590E−08

[Specifications]
Zoom Ratio = 4.695

| | W | M | T |
|---|---|---|---|
| f = | 7.00400 | 14.00000 | 32.88298 |
| FNO = | 3.65 | 4.26 | 5.96 |
| 2ω = | 63.9° | 31.7° | 13.5° |
| Y = | 4.05 | 4.05 | 4.05 |
| TL = | 50.30074 | 49.68146 | 54.983 |
| BF = | 0.61701 | 0.60001 | 0.58300 |
| d3 = | 1.20000 | 6.44583 | 11.21094 |
| d9 = | 18.18384 | 8.93704 | 2.00000 |
| d16 = | 5.19542 | 6.88247 | 15.66922 |
| d18 = | 2.63847 | 4.13847 | 3.13847 |

[Lens Group Data]

| Group | I | Focal Length |
|---|---|---|
| 1 | 1 | 34.80802 |
| 2 | 4 | −9.31152 |
| 3 | 11 | 12.28038 |
| 4 | 17 | 24.15307 |

TABLE 4-continued

Example 4

[Values for Conditional Expressions]

(1) Ndn = 1.92286
(2) f1/fw = 4.970
(3) X1/fw = 0.6685
(4) Lw/fw = 7.182

I: start surface number of each lens group

Figure 8A:
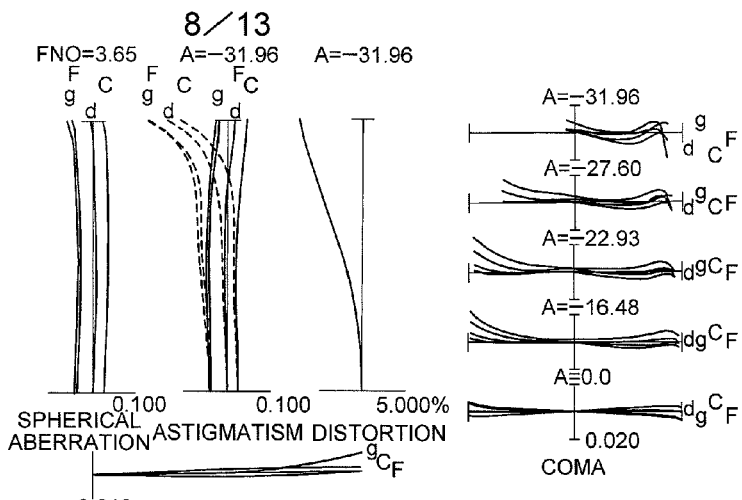
FIGS. 8A, 8B and 8C are diagrams showing the various aberrations of the zoom lens according to Example 4 of the present application in the infinite-distance focusing state in the wide-angle end state, the intermediate focal length state and the telephoto end state, respectively.
Figure 8B:
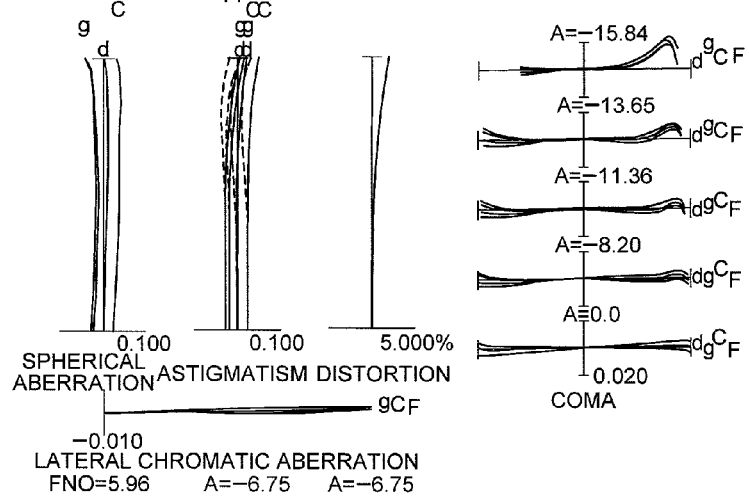
Figure 8C:
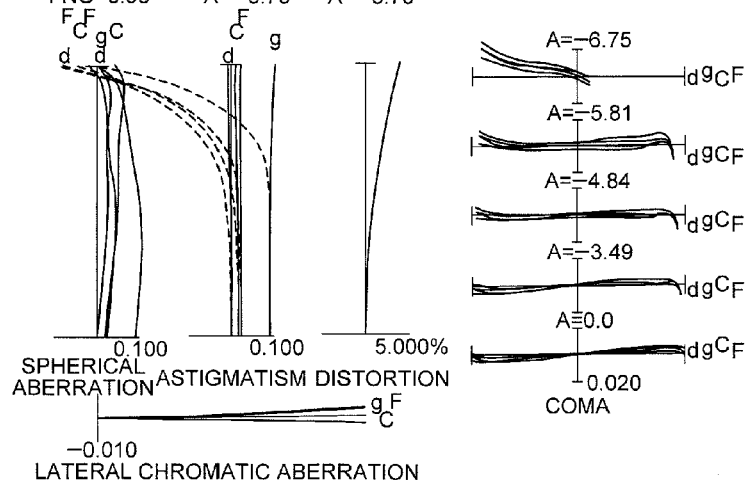

FIGS. 8A, 8B and 8C are diagrams showing the various aberrations of the zoom lens according to Example 4 of the present application in the infinite-distance focusing state in the wide-angle end state, the intermediate focal length state and the telephoto end state, respectively.

It is understood from FIGS. 8A, 8B and 8C that the zoom lens according to Example 4 preferably corrects the various aberrations in a way that ranges from the wide-angle end state to the telephoto end state, and exhibits the outstanding optical performance.

Example 5

FIG. 9 is a sectional view of a lens configuration of a zoom lens according to Example 5 of the present application.

The zoom lens according to Example 5 includes, in order from the object side, a first lens group G1 having positive refractive power, a second lens group G2 having negative refractive power, a third lens group G3 having positive refractive power and a fourth lens group G4 having positive refractive power.

The first lens group G1 is composed of, in order from the object side, a cemented lens constructed by a negative meniscus lens L11 with a convex surface directed to the object side cemented with a positive meniscus lens L12 with a convex surface directed to the object side. Note that the negative meniscus lens L11 is composed of a glass of which a refractive index with respect to d-line (wavelength λ=587.6 nm) is larger than 1.90.

The second lens group G2 is composed of, in order from the object side, a negative meniscus lens L21 with a convex surface directed to the object side, a biconcave negative lens L22 and a positive meniscus lens L23 with a convex surface directed to the object side. Note that the image-sided surface of the negative meniscus lens L21 is an aspherical surface.

The third lens group G3 is composed of, in order from the object side, a biconvex positive lens L31 and a cemented lens constructed by a positive meniscus lens L32 with a convex surface directed to the object side cemented with a negative meniscus lens L33 with a convex surface directed to the object side. Note that the object-sided surface of the biconvex positive lens L31 is an aspherical surface.

The fourth lens group G4 is composed of a positive meniscus lens L41 with a convex surface directed to the object side. Incidentally, the object-sided surface of the positive meniscus lens L41 is an aspherical surface.

In the zoom lens according to Example 5, an aperture stop S is disposed between the second lens group G2 and the third lens group G3, and a flare-cut stop FS is disposed between the third lens group G3 and the fourth lens group G4. Then, these stops S and FS move integrally with the third lens group G3 upon zooming from the wide-angle end state to the telephoto end state. Further, a filter group FL consisting of a low-pass filter, an infrared-ray cut filter, etc is disposed between the fourth lens group G4 and the image plane I.

In the thus-constructed zoom lens according to Example 5, upon zooming from the wide-angle end state to the telephoto end state, the first lens group G1, the second lens group G2 and the third lens group G3 move along the optical axis so that a distance between the first lens group G1 and the second lens group G2 increases, a distance between the second lens group G2 and the third lens group G3 decreases, and a distance between the third lens group G3 and the fourth lens group G4 increases.

The following Table 5 shows the values of the various items of data of the zoom lens according to Example 5 of the present application.

TABLE 5

Example 5

[Surface Data]

| Surface Number | r | d | nd | νd |
|---|---|---|---|---|
| object | ∞ | | | |
| 1) | 18.5517 | 0.9000 | 1.945944 | 17.98 |
| 2) | 15.2389 | 3.3000 | 1.640000 | 60.20 |
| 3) | 173.1000 | variable | 1.000000 | |
| 4) | 112.3140 | 1.0000 | 1.806100 | 40.88 |
| *5) | 6.5795 | 2.8000 | 1.000000 | |
| 6) | −33.4717 | 0.7000 | 1.754998 | 52.32 |
| 7) | 22.3997 | 0.2000 | 1.000000 | |
| 8) | 12.4010 | 1.9000 | 1.808095 | 22.76 |
| 9) | 171.6781 | variable | 1.000000 | |
| 10) (S) | ∞ | 1.5000 | 1.000000 | |
| *11) | 9.5483 | 1.7000 | 1.589130 | 61.18 |
| 12) | −17.8950 | 0.2000 | 1.000000 | |
| 13) | 6.3960 | 2.7000 | 1.497820 | 82.52 |
| 14) | 31.6410 | 1.1000 | 1.795041 | 28.69 |
| 15) | 4.6330 | 1.0000 | 1.000000 | |
| 16) (FS) | ∞ | variable | 1.000000 | |
| *17) | 9.5068 | 1.7000 | 1.516330 | 64.06 |
| 18) | 38.0774 | variable | 1.000000 | |
| 19) | ∞ | 0.5530 | 1.544370 | 70.51 |
| 20) | ∞ | 0.5130 | 1.000000 | |
| 21) | ∞ | 0.5000 | 1.516330 | 64.14 |
| 22) | ∞ | BF | 1.000000 | |

[Aspherical Surface Data]

Surface number = 5

| κ = | −2.5841 |
|---|---|
| A4 = | 1.57530E−03 |
| A6 = | −2.57130E−05 |
| A8 = | 7.65800E−07 |
| A10 = | −6.48840E−09 |

Surface number = 11

| κ = | 0.5230 |
|---|---|
| A4 = | −2.20960E−04 |
| A6 = | 8.47600E−06 |
| A8 = | −1.70750E−06 |
| A10 = | 1.14730E−07 |

Surface number = 17

| κ = | 3.7055 |
|---|---|
| A4 = | −4.83960E−04 |
| A6 = | −2.19170E−05 |
| A8 = | 1.03460E−06 |
| A10 = | −6.31190E−08 |

[Specifications]
Zoom Ratio = 4.695

| | W | M | T |
|---|---|---|---|
| f = | 7.00400 | 14.00000 | 32.88297 |
| FNO = | 3.65 | 4.19 | 5.78 |
| 2ω = | 63.8° | 31.9° | 13.5° |
| Y = | 4.05 | 4.05 | 4.05 |

TABLE 5-continued

Example 5

| TL = | 50.24582 | 50.01994 | 54.983 |
|---|---|---|---|
| BF = | 0.61701 | 0.60000 | 0.58298 |
| d3 = | 1.20000 | 7.20901 | 11.92124 |
| d9 = | 18.23131 | 9.11522 | 2.01663 |
| d16 = | 5.30880 | 6.70700 | 15.07343 |
| d18 = | 2.62271 | 4.12271 | 3.12271 |

[Lens Group Data]

| Group | I | Focal Length |
|---|---|---|
| 1 | 1 | 35.70153 |
| 2 | 4 | −9.43720 |
| 3 | 11 | 12.36132 |
| 4 | 17 | 24.05167 |

[Values for Conditional Expressions]

| (1) Ndn = | 1.94594 |
|---|---|
| (2) f1/fw = | 5.097 |
| (3) X1/fw = | 0.6764 |
| (4) Lw/fw = | 7.174 |

I: start surface number of each lens group

Figure 10A:
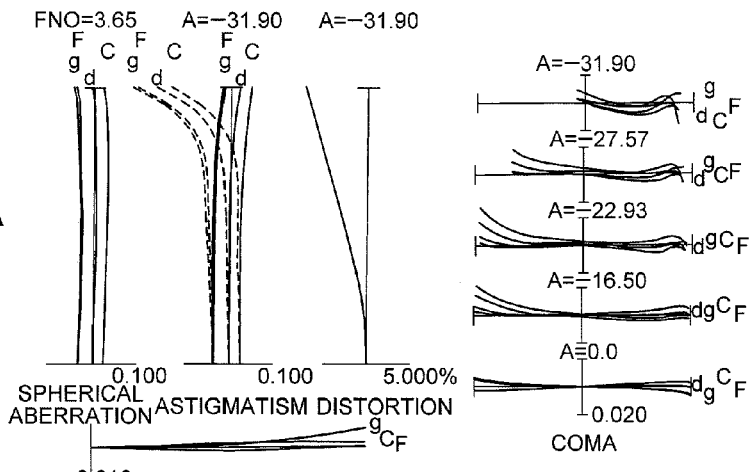
FIGS. 10A, 10B and 10C are diagrams showing the various aberrations of the zoom lens according to Example 5 of the present application in the infinite-distance focusing state in the wide-angle end state, the intermediate focal length state and the telephoto end state, respectively.
Figure 10B:
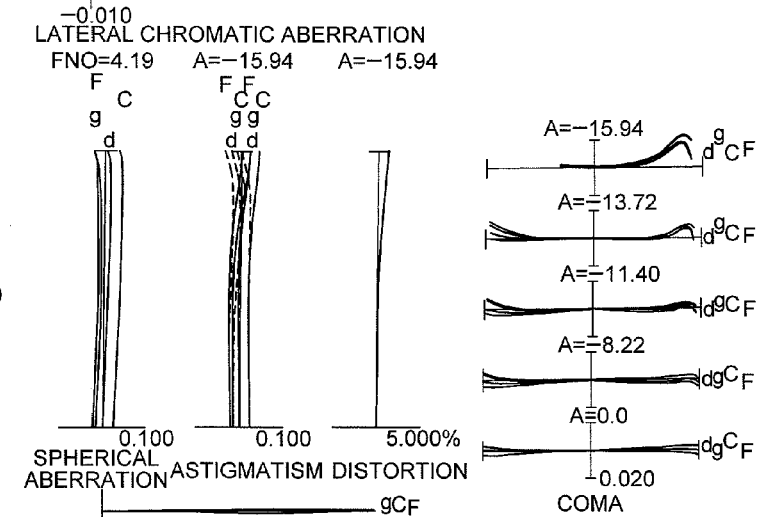

FIGS. 10A, 10B and 100 are diagrams showing the various aberrations of the zoom lens according to Example 5 of the present application in the infinite-distance focusing state in the wide-angle end state, the intermediate focal length state and the telephoto end state, respectively.

Figure 10C:
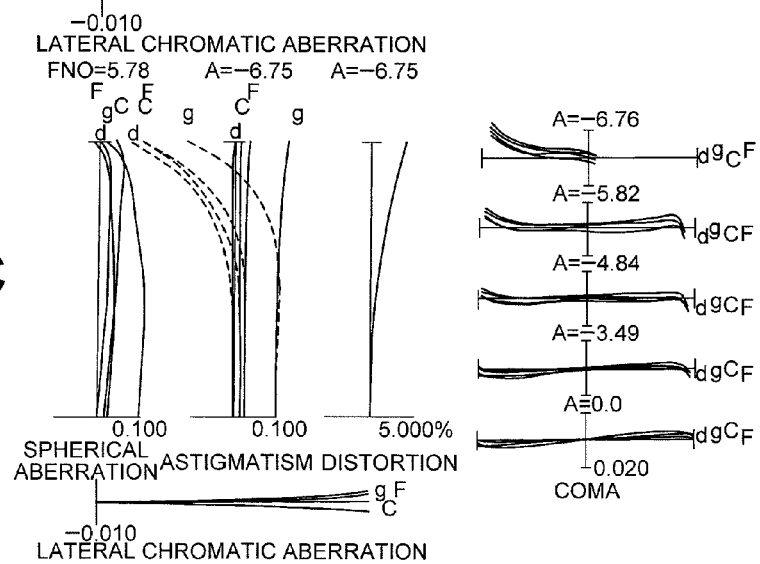

It is understood from FIGS. 10A, 10B and 10C that the zoom lens according to Example 5 preferably corrects the various aberrations in a way that ranges from the wide-angle end state to the telephoto end state, and exhibits the outstanding optical performance.

According to Examples discussed above, it is feasible to realize the downsized zoom lens having high optical performance. Herein, the respective Examples are exemplified by way of specific examples of the invention of the present application, however, the invention of the present application is not limited to these working examples. It should be noted that the following contents can be properly adopted within a range which does not affect the optical performance of the zoom lens of the present application.

A 4-group configuration has been exemplified by way of Example of the numerical values of the zoom lens of the present application, however, the present application is not limited to this lens group configuration, and it is also feasible to build up the zoom lenses of a 5-group configuration, a 6-group configuration, etc. To be specific, it is possible to exemplify a configuration of adding the positive lens group on the closest-to-the-object side, a configuration of adding the positive or negative lens group on the closest-to-the-image side and a configuration of adding the positive or negative lens group between the first lens group and the fourth lens group.

Moreover, the zoom lens of the present application may take a configuration of moving a portion of a lens group, one lens group or a plurality of lens groups as a focusing lens group(s) in the direction of the optical axis in order to perform focusing on the near-distance object from the infinite-distance object. Especially, it is preferable that the first lens group or the fourth lens group is used as the focusing lens group. Further, the focusing lens group can be also applied to an auto focus and is suited to driving a motor (such as an ultrasonic motor) for the auto focus.

Moreover, the zoom lens of the present application can takes also a configuration of correcting an image blur caused by a hand vibration (camera shake) by shifting any one of a lens group or a part of the lens group as a vibration reduction lens group in the direction perpendicular to the optical axis. In particular, it is preferable that in the zoom lens of the present application, at least a portion of the second lens group or the third lens group serves as the vibration reduction lens group.

Furthermore, the lens surface of each of the lenses configuring the zoom lens of the present application may be a spherical surface or a plane surface or an aspherical surface. A case that the lens surface is a spherical surface or a plane surface facilitates lens processing and an assembly adjustment and is preferable because of preventing the optical performance from being deteriorated due to an error of the processing and the assembly adjustment. Even if the image plane deviates, there is a small amount of deterioration of rendering performance, which is the desirable aspect. Moreover, if the lens surface is an aspherical surface, any inconvenience may not be caused by forming this aspherical surface as any one of an aspherical surface based on a fine grinding, a glass mold aspherical surface formed by molding the glass in an aspherical shape and a composite aspherical surface formed by coating a resin over the surface of the glass in the aspherical shape. Further, the lens surface may be formed as a diffractive optical surface, and the lens may be formed as a graded index lens (GRIN lens) or a plastic lens.

Further, the aperture stop is, it is preferable, disposed in the vicinity of the third lens group, however, an available configuration is that a lens frame substitutes for a role of the aperture stop without providing a member as the aperture stop.

Moreover, the lens surface of the lenses configuring the zoom lens of the present application may be coated with an anti-reflection film having a high transmittance in a broad wave range. With this contrivance, it is feasible to attain the high contrast and the high optical performance by reducing a flare and ghost.

The zoom lens of the present application has a zoom ratio on the order of 3.5 to 10 and more preferably 4 to 6.

Furthermore, it is preferable that in the zoom lens of the present application, the first lens group includes one positive lens element and one negative lens element.

Further, it is preferable that in the zoom lens of the present application, the second lens group includes one positive lens element and two negative lens elements. Still further, it is preferable that these lens elements of the second lens group are disposed in a negative/negative/positive order through air distances therebetween in order from the object side.

Yet further, it is preferable that in the zoom lens of the present application, the third lens group includes two positive lens elements or one positive lens element and one negative lens element. Yet further, it is desirable that these lens elements of the third lens group are disposed in a positive/positive or positive/negative order through an air distance therebetween in order from the object side.

Next, a camera equipped with the present zoom lens will hereinafter be described with reference to FIGS. 11A and 11B.

Figure 11A:
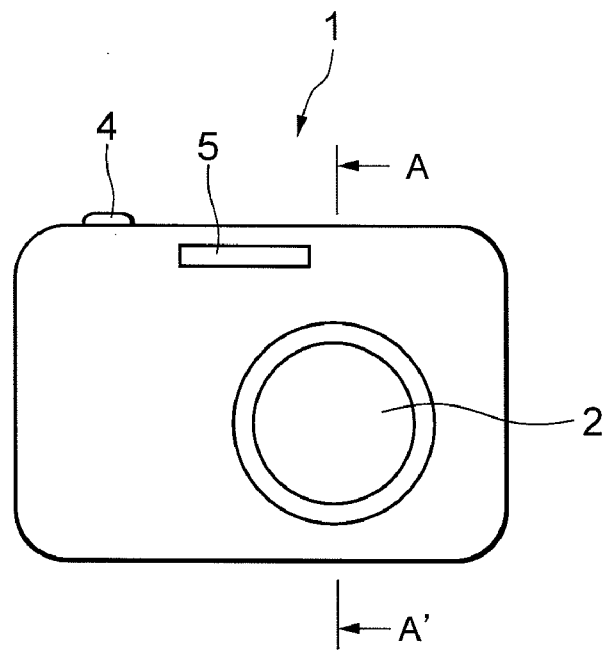
FIGS. 11A and 11B are respectively a front view and a rear view of an electronic still camera including the zoom lens of the present application.
Figure 11B:
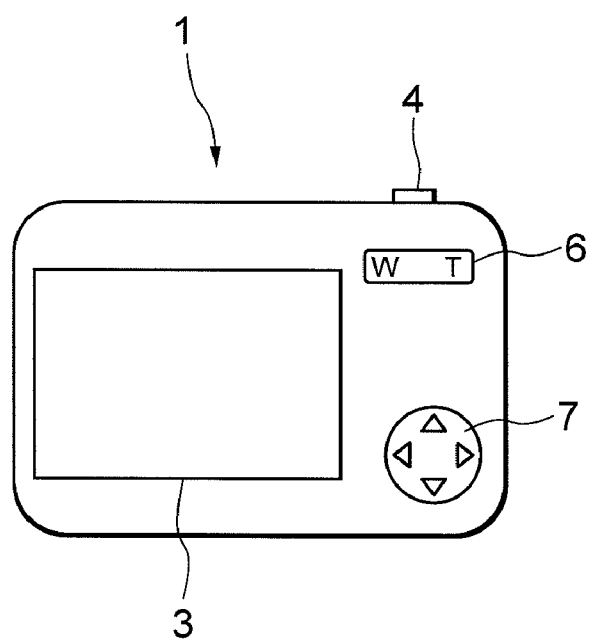

FIGS. 11A and 11B are respectively a front view and a rear view of an electronic still camera including the zoom lens of the present application. Further, FIG. 12 is a sectional view taken along the line A-A' in FIG. 11A.

Figure 12:
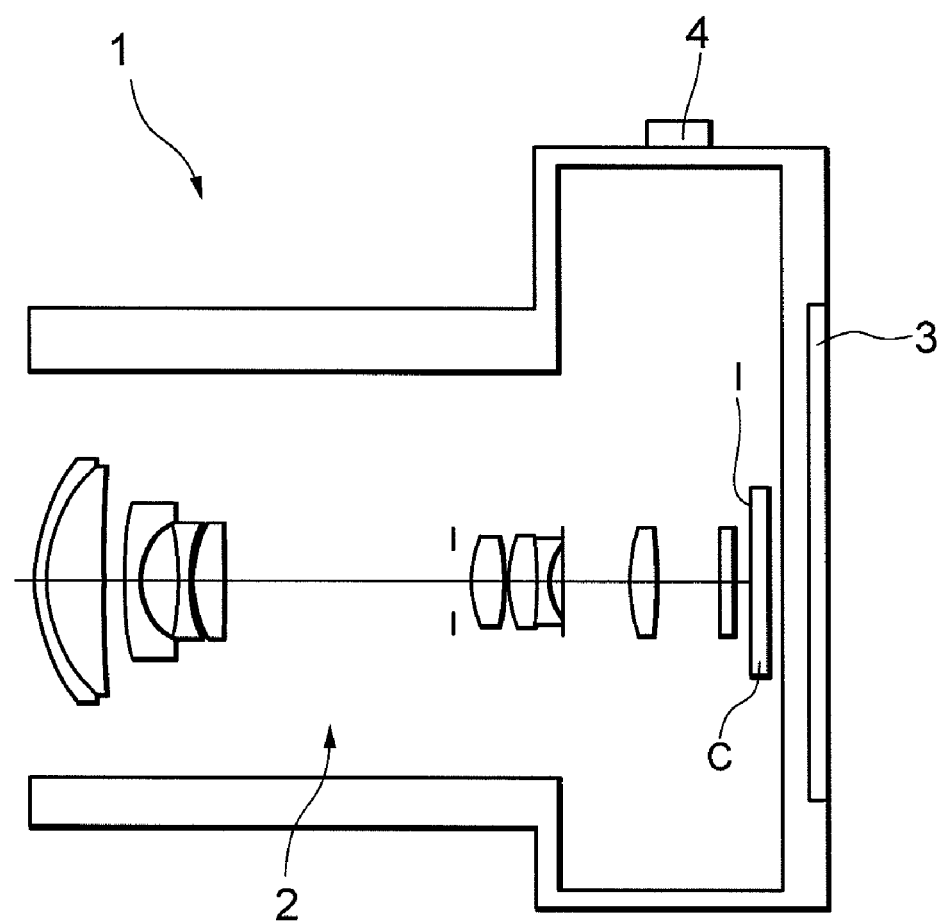
FIG. 12 is a sectional view taken along the line A-A' in FIG. 11A.

The camera 1 is classified into an electronic still camera which includes, as illustrated in FIGS. 11A, 11B and 12, the zoom lens given as a photographing lens 2 according to Example 1.

In the camera 1, when a photographer pushes down an unillustrated power button, an unillustrated shutter, which covers the photographing lens 2, is opened. Upon this operation, the light beams traveling from an unillustrated object (the object to be imaged) get incident on the photographing lens 2, and it follows that the photographing lens 2 condenses the light beams on the imaging device (e.g., CCD, (Charge Coupled Devices) and CMOS (Complementary Metal Oxide Semiconductors), etc) C disposed on the image plane I, and an object image is formed thereon. The object image is captured by the imaging device C and displayed on a liquid crystal monitor 3 provided in a rear surface of the camera 1. With this operation, the photographer, after determining a composition of the object image while looking at the liquid crystal monitor 3, pushes down a release button 4 with the result that the object image is captured by the imaging device C and the captured image is recorded and stored in an unillustrated memory. Thus, the photographer can photograph the object by the camera 1.

It should be noted that the camera 1 further includes an auxiliary light emitting unit 5 which emits auxiliary light in the case of a dark photographing environment, a wide/tele (wide-angle/telephoto) switch 6 for zooming the zoom lens defined as the photographing lens 2 from the wide-angle end state to the telephoto end state, a function button 7 for setting a variety of conditions of the camera 1, and so on.

Herein, the zoom lens according to Example 1, which is mounted as a photographing lens 2 into the camera 1, is the downsized zoom lens exhibiting the high optical performance owing to the characteristic lens configuration as discussed in Example 1. This configuration enables to the camera 1 to attain the downsizing and high optical performance.

Note that the same effects as those of the camera 1 can be, as a matter of course, exhibited even when configuring the camera mounted with the zoom lens serving as the photographing lens 2 according to each of the second through fifth working examples.

Moreover, the zoom lens of the present application, without being limited to the electronic still camera described above, can be applied to other types of imaging apparatuses such as a digital video camera and a film camera. Further, the zoom lens of the present application can be also applied as a lens exchange type of lens.

Based on what has been discussed so far, it is feasible to provide the downsized zoom lens exhibiting the high optical performance, the imaging apparatus, the method of varying the magnification of the zoom lens and the zoom lens manufacturing method.

What is claimed is:

1. A zoom lens comprising, in order from an object side:
   a first lens group having positive refractive power;
   a second lens group having negative refractive power; and
   a third lens group having positive refractive power,
   each distance between said lens groups adjacent to each other changing upon zooming from a wide-angle end state to a telephoto end state,
   said first lens group having a cemented lens including a negative lens, and
   said third lens group having a cemented lens, and
   the following conditional expressions being satisfied:

$1.90 < Ndn < 2.50$ $4.50 < f1/fw < 7.00$ where Ndn denotes a refractive index with respect to the d-line ($\lambda=587.56$ nm) of the negative lens of the first lens group, f1 denotes a focal length of said first lens group, and fw denotes a focal length of said zoom lens in the wide-angel end state.

2. The zoom lens according to claim 1, wherein the following conditional expression is satisfied:

$$0.50 < X1/fw < 1.80$$

where X1 denotes a moving amount along an optical axis of said first lens group upon zooming from the wide-angle end state to the telephoto end state.

3. The zoom lens according to claim 1, wherein said third lens group includes, in order from the object side, a positive lens and a cemented lens, and said cemented lens of said third lens group includes, in order from the object side, a positive lens and a negative lens.

4. The zoom lens according to claim 1, wherein said second lens group includes, in order from the object side, a first negative lens, a second negative lens and a positive lens.

5. The zoom lens according to claim 4, wherein an image side surface of said first negative lens of said second lens group is an aspherical surface.

6. The zoom lens according to claim 1, wherein upon zooming from the wide-angle end state to the telephoto end state, a distance between said first lens group and said second lens group increases, and a distance between said second lens group and said third lens group decreases.

7. The zoom lens according to claim 1, wherein upon zooming from the wide-angle end state to the telephoto end state, said first lens group, said second lens group and said third lens group move on an optical axis.

8. The zoom lens according to claim 1, wherein the following conditional expression is satisfied:

$$7.00 < Lw/fw < 7.80$$

where Lw denotes a total lens length of said zoom lens in the wide-angle end state.

9. The zoom lens according to claim 1, wherein said third lens group has an aspherical surface.

10. The zoom lens according to claim 1, wherein said first lens group is constructed by only a cemented lens including said negative lens.

11. The zoom lens according to claim 1, wherein each of the lens surfaces of said first lens group is formed as a spherical surface or a plane surface.

12. The zoom lens according to claim 1, wherein said negative lens of said first lens group takes a meniscus shape with a convex surface directed to the object side.

13. The zoom lens according to claim 1, wherein said negative lens of said first lens group is disposed on the side closest to the object.

14. The zoom lens according to claim 1, further comprising a fourth lens group having positive refractive power on the image side of said third lens group,
wherein upon zooming from the wide-angle end state to the telephoto end state, a distance between said third lens group and said fourth lens group changes.

15. The zoom lens according to claim 14, wherein said fourth lens group is constructed by only one positive lens.

16. The zoom lens according to claim 14, wherein upon zooming from the wide-angle end state to the telephoto end state, a distance between said third lens group and said fourth lens group increases.

17. The zoom lens according to claim 14, wherein said fourth lens group has an aspherical surface.

18. An imaging apparatus equipped with said zoom lens according to claim 1.

19. A method for manufacturing a zoom lens including, in order from an object side, a first lens group, a second lens group and a third lens group, said method comprising steps of:
disposing lenses of said first lens group in a way that has positive refractive power and includes a cemented lens containing a negative lens with satisfying the following conditional expression:

$$1.90 < Ndn < 2.50$$

where Ndn denotes a refractive index with respect to the d-line ($\lambda$=587.56 nm) of the negative lens of the first lens group;
disposing lenses of said second lens group so as to have negative refractive power;
disposing lenses of said third lens group in a way that has positive refractive power and includes a cemented lens;
disposing said first through said third lens groups so as to make variable the distance between said lens groups adjacent to each other upon zooming from a wide-angle end state to a telephoto end state; and
disposing said lenses of said zoom lens so as to satisfy the following conditional expression:

$$4.50 < f1/fw < 7.00$$

where f1 denotes a focal length of said first lens group, and fw denotes a focal length of said zoom lens in the wide-angle end state.

20. The method for manufacturing the zoom lens according to claim 19, further comprising a step of:
disposing said lenses of said zoom lens so as to satisfy the following conditional expression:

$$0.50 < X1/fw < 1.80$$

where X1 denotes a moving amount along an optical axis of said first lens group upon zooming from the wide-angle end state to the telephoto end state.

21. The method of manufacturing the zoom lens according to claim 19, further comprising a step of:
forming each of the lens surfaces of said first lens group as a spherical surface or a plane surface.

22. A zoom lens comprising, in order from an object side:
a first lens group having positive refractive power;
a second lens group having negative refractive power; and
a third lens group having positive refractive power,
each distance between said lens groups adjacent to each other changing upon zooming from a wide-angle end state to a telephoto end state,
said first lens group having a cemented lens including a negative lens, and
said third lens group having a cemented lens, and
the following conditional expressions being satisfied:

$$1.90 < Ndn < 2.50$$

$$0.50 < X1/fw < 1.80$$

where Ndn denotes a refractive index with respect to the d-line ($\lambda$=587.56 nm) of the negative lens of the first lens group, X1 denotes a moving amount along an optical axis of said first lens group upon zooming from the wide-angle end state to the telephoto end state, and fw denotes the focal length of said zoom lens in the wide-angle end state.

23. A zoom lens comprising, in order from an object side:
a first lens group having positive refractive power;
a second lens group having negative refractive power; and
a third lens group having positive refractive power,
each distance between said lens groups adjacent to each other changing upon zooming from a wide-angle end state to a telephoto end state,
said first lens group having a cemented lens including a negative lens, and
said third lens group having a cemented lens, and the following conditional expressions being satisfied:

$$1.90 < Ndn < 2.50$$

$$7.00 < Lw/fw < 7.80$$

where Ndn denotes a refractive index with respect to the d-line (λ=587.56 nm) of the negative lens of the first lens group, Lw denotes a total lens length of said zoom lens in the wide-angle end state, and fw denotes a focal length of said zoom lens in the wide-angle end state.

24. A zoom lens comprising, in order from an object side:
a first lens group having positive refractive power;
a second lens group having negative refractive power; and
a third lens group having positive refractive power,
each distance between said lens groups adjacent to each other changing upon zooming from a wide-angle end state to a telephoto end state,
said first lens group having a cemented lens including a negative lens,
each of the lens surfaces of said first lens group being formed as a spherical surface or a plane surface,
said third lens group having a cemented lens, and
the following conditional expression being satisfied:

$$1.90 < Ndn < 2.50$$

where Ndn denotes a refractive index with respect to the d-line (λ=587.56 nm) of the negative lens of the first lens group.

* * * * *